(12) United States Patent
Yoshimura

(10) Patent No.: US 6,413,184 B1
(45) Date of Patent: Jul. 2, 2002

(54) POWER TRANSMISSION SYSTEM FOR FOUR-WHEEL DRIVE VEHICLE

(75) Inventor: Takahiro Yoshimura, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/541,721

(22) Filed: Apr. 3, 2000

(30) Foreign Application Priority Data

Apr. 5, 1999 (JP) ............................................ 11-097549
Feb. 28, 2000 (JP) ...................................... 2000-052378

(51) Int. Cl.$^7$ ...................... F16H 37/08; B60K 17/354; B60K 17/35
(52) U.S. Cl. ........................ 475/204; 475/206; 475/203; 180/247; 180/249
(58) Field of Search ................................. 475/204, 205, 475/206, 198, 220; 74/665 GE; 180/248–250

(56) References Cited

U.S. PATENT DOCUMENTS 5,183,132 A * 2/1993 Fujisawa .................... 180/247
6,142,905 A * 11/2000 Brown et al. ............... 475/206

FOREIGN PATENT DOCUMENTS

| JP | 5-77651 | | 3/1993 |
| JP | 6-344783 | | 12/1994 |
| JP | 07186761 | * | 7/1995 |
| JP | 08108768 | * | 4/1996 |
| JP | 9-123777 | | 5/1997 |
| JP | 09300998 | * | 11/1997 |
| JP | WO 00/10830 | * | 3/2000 |

* cited by examiner

Primary Examiner—Sherry Estremsky
Assistant Examiner—Tisha D. Lewis
(74) Attorney, Agent, or Firm—Oblon, Spivak, McClelland, Maier & Neustadt, P.C.

(57) ABSTRACT

A power transmission system for a four-wheel drive vehicle, comprising a differential mechanism having a torque sensing type differential limiting function. Further comprised are: a torque distribution mechanism for transmitting the torque to a front-wheel drive shaft connected to the front wheels or a rear-wheel drive shaft connected to the rear wheels; a first selective coupling mechanism for coupling the torque distribution mechanism selectively to one of two output elements of the differential mechanism; and a second selective coupling mechanism for coupling an input member and one of the output members, when the first selective coupling mechanism releases the coupling between the torque distributing mechanism and the front-wheel or rear-wheel side drive member, to integrate the differential mechanism as a whole thereby to establish a two-wheel drive state.

20 Claims, 10 Drawing Sheets

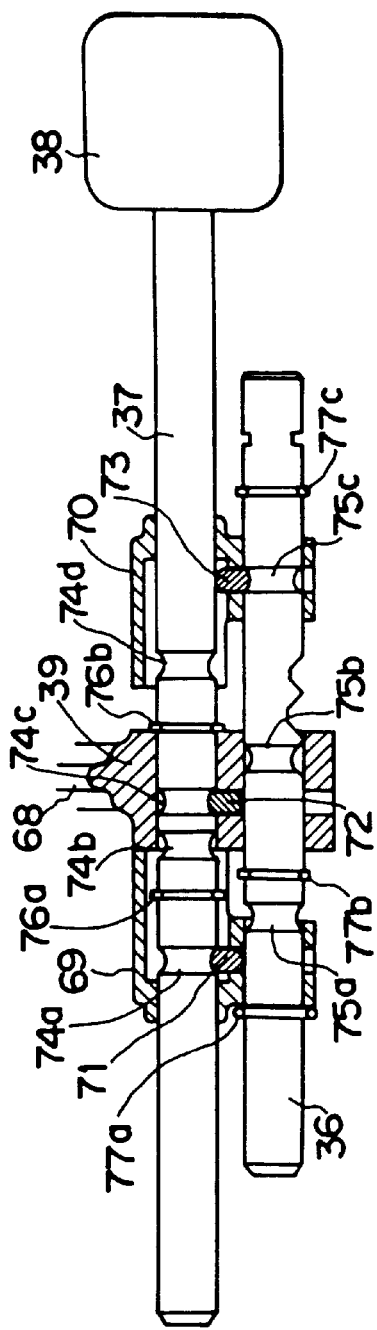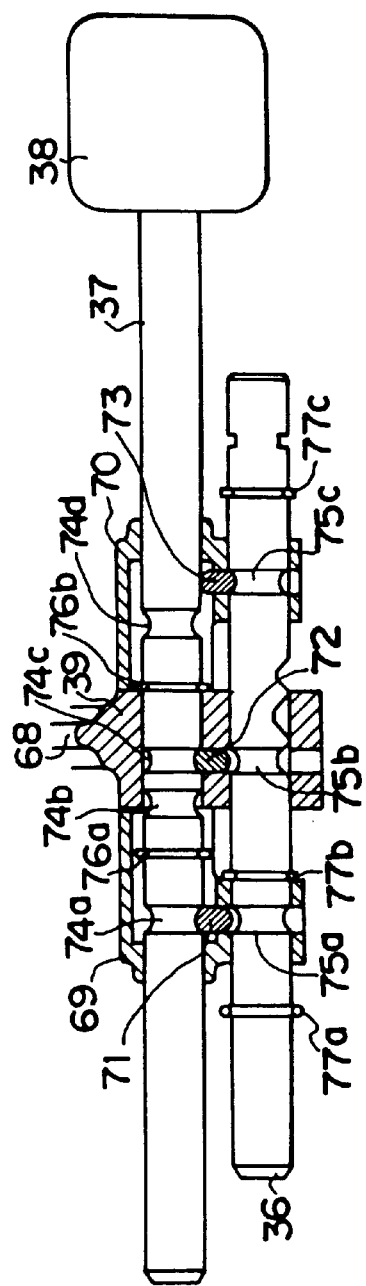
FIG. 4A
FIG. 4B

POWER TRANSMISSION SYSTEM FOR FOUR-WHEEL DRIVE VEHICLE

BACKGROUND OF THE INVENTION

1. Field of the Invention

The present invention relates to a power transmission system for a four-wheel drive vehicle, for distributing and transmitting a torque, as outputted from a power source through a speed change device, to front and rear wheels.

2. Related Art

The four-wheel drive vehicle is enabled to have an enhanced runability on a muddy road or a rough road by transmitting the driving force to all the front and rear wheels. Another advantage is that a running stability on the ordinary road is also enhanced by sharing the driving force among all the four front and rear wheels. Since the power transmission path is complicated, on the contrary, the power loss is increased by the friction. In order to prevent the braking phenomenon (i.e., the tight corner braking) at a turning time, on the other hand, there is needed a center differential for causing differential rotations between the front and rear wheels. Moreover, the provision of the center differential requires a limiting device for limiting the differential action of the center differential so as to prevent the so-called "off-torque" when any one of the front and rear wheels rotates idle due to a slip.

When the driving force outputted from the power source such as an engine is thus distributed and transmitted to the four front and rear wheels, various devices are necessary for eliminating the various disadvantages at the running time. When these devices are provided individually and randomly, however, the entire construction is enlarged to raise disadvantages that not only the mountability is degraded but also the weight of and the cost for the vehicle body are increased. Generally in the prior art, therefore, there have been tried technical improvements for using a device having a plurality of functions or for devising the array of various devices, as exemplified in Japanese Patent Laid-Open No. 9-123777.

In the system disclosed in this Laid-Open, a differential device (or a center differential) having a torque sensing type differential limiting function for limiting the differential torque between the front and rear wheels in accordance with the torque difference between the torque to be distributed to the front wheels and the torque to be distributed to the rear wheels is arranged coaxially with the front differential. Moreover, a direct coupling clutch (or a differential lock clutch) for integrating a member to transmit the torque to the front wheels and a member to transmit the torque to the rear wheels is also arranged coaxially with those center differential and front differential.

In the disclosed system, therefore, the torque inputted to the center differential is distributed and transmitted to the output member on the side of the front wheels and the output member on the side of the rear wheels when the direct coupling clutch is released. When a speed difference occurs between the front wheels and the rear wheels at a turning time, moreover, the center differential performs the differential action to absorb the speed difference. When the torque difference increases, moreover, the differential limiting torque rises to limit the differential rotations between the front and rear wheels.

When the direct coupling clutch is applied, on the contrary, the two output members in the center differential are integrally coupled by the direct coupling clutch so that the center differential rotates as a whole to eliminate the differential rotations between the front and rear wheels. In other words, the torque can be transmitted, even if any one of the front and rear wheels rotates idly, to the remaining wheels.

In the system disclosed in the Laid-Open, the means for the differential limit of the front and rear wheels need not be provided separately from the center differential, but the center differential, the front differential and the direct coupling clutch can be arrayed on the common line so that the system can be made compact as a whole.

When the coefficient of friction on the road surface is low as on a muddy road or a seriously undulating rough road or when the individual wheels have different coefficients of friction with the road surface, the run can be ensured by distributing the torque among the four front and rear wheels while performing the differential limit, as described above. However, even the four-wheel drive vehicle does not run exclusively on the rough road or a road having low friction coefficient but frequently runs on an excellent car road paved with asphalt to have a high friction coefficient. If the driving force is transmitted to all the four front and rear wheels even on the excellent car road, an unnecessary power loss may be caused by the friction at the power transmission system.

The four-wheel drive system of the prior art thus far described is enabled to perform the differential action by setting the center differential free or not by locking the center differential by the direct coupling clutch. With or without the differential rotations between the front and rear wheels, however, what is established is the four-wheel drive state in which the power is transmitted to the front and rear wheels, but cannot be the two-wheel drive state in which the power is transmitted to either the front wheels or the rear wheels. In the case of running on a dry paved road, therefore, the fuel economy may be deteriorated by the friction loss. In other words, the two-wheel drive state cannot be set to invite a disadvantage in the versatility.

In the prior art, on the other hand, there is known the so-called "part-time" four-wheel drive system capable of selecting the two-wheel drive state and the four-wheel drive state by the manual operation. This system is provided with a switching mechanism for coupling a transfer to transmit the power to the front wheels or the rear wheels selectively to the output member of a transmission. In this four-wheel drive system, the four-wheel drive state is established by coupling the transfer and the output member of the transmission, and the power is transmitted to only the front wheels or the rear wheels to establish the two-wheel drive state by releasing the coupled state. The switching mechanism of this kind can be added to the aforementioned system disclosed in the Laid-Open. In this case, the system may be large-sized or the characteristics of the individual drive states may change, depending upon the arrangement or assembly of the switching mechanism, so that the technical items to be considered diverge in many ways. In the prior art, however, the space efficiency or the mountability has neither been considered, nor has developed any proper array for the switching mechanism or the transfer.

Moreover, the four-wheel drive vehicle is intrinsically intended to improve the runability on a rough road or the uphill performance. In addition of the ordinary transmission for setting a gear ratio according to the vehicle speed or the accelerator opening, therefore, a speed change mechanism for switching the high-low gear ratios may be provided for especially raising the driving force. This speed change mechanism is associated with the four-wheel drive system such as the transfer or differential mechanism so that it is arranged together with the latter. In the prior art, however, neither special investigation nor technical development has been made on the arrangement of the speed change mechanism for switching the high-low gear ratios, but it is customary merely to array the speed change mechanism on the axis common to the differential mechanism or the like. This may elongate the four-wheel drive system in its entirety and deteriorate its mountability.

SUMMARY OF THE INVENTION

A main object of the invention is to provide a power transmission system for a four-wheel drive vehicle, which can be made compact.

Another object of the invention is to provide a power transmission system for a four-wheel drive vehicle, which is enabled to reduce the size by reducing the external diameter of a differential mechanism to make effective use of a surplus space around the differential mechanism.

Still another object of the invention is to provide a power transmission system which can set a two-wheel drive state and four-wheel drive states with and without a differential action and which is short in its overall length.

A further object of the invention is to provide a power transmission system for a four-wheel drive vehicle, which can switch an input to a differential mechanism for differential rotations between the front wheels and the rear wheels and which can be shortened in its overall length.

According to an aspect of the invention, therefore, there is provided a power transmission system for a four-wheel drive vehicle, comprising: a differential mechanism having a torque sensing type limiting function and including an input element and two output elements made rotatable differentially of each other by receiving a power from the input element for establishing a torque limiting a differential rotation in response to the input torque, one of the two output elements being integrated with a front wheel side drive member, and the other output element being coupled to a rear wheel side drive member. Moreover, this power transmission system further comprises: a torque distribution mechanism for transmitting the torque to a front-wheel drive shaft connected to the front wheels or a rear-wheel drive shaft connected to the rear wheels; a first selective coupling mechanism for coupling the torque distribution mechanism selectively to the front-wheel side drive member or the rear-wheel side drive member; and a second selective coupling mechanism for coupling the input member and one of the output members, when the first selective coupling mechanism releases the coupling between the torque distributing mechanism and the front-wheel or rear-wheel side drive member, to integrate the differential mechanism thereby to establish a two-wheel drive state.

In the power transmission system of the invention, therefore, the torque is inputted to the input member in the differential mechanism and is transmitted to the individual output members and further to the drive member on the side of the front wheels and the drive member on the side of the rear wheels. When the front-wheel side drive member or the rear-wheel side drive member and the torque distributing mechanism are coupled in this case by the first selective coupling mechanism, the torque transmitted to the input member is distributed and transmitted to the front wheels and the rear wheels to establish the four-wheel drive state. On the other hand, the differential mechanism comes into the so-called "free state" so that the differential limiting force rises according to the input torque thereby to execute the torque sensing type differential limit. On the other hand, the differential mechanism can be integrated as a whole by the second selective coupling mechanism. In this state, the torque distributing mechanism can be decoupled from the front-wheel side drive member or the rear-wheel side drive member by the first selective coupling mechanism thereby to establish the two-wheel drive state in which the differential mechanism is integrated, so that the torque inputted to the differential mechanism is outputted as it is from any output member to the drive member on the front or rear wheel side. In short, the four-wheel drive and the two-wheel drive can be switched.

On the other hand, the differential mechanism having the torque sensing type differential limiting function in the invention can be exemplified by a construction in which the planet pinion gear is held in frictional contact with the inside of the case member. By coupling one side gear meshing with the planet pinion gear and the case member by the coupling means, moreover, the differential mechanism is integrated to inhibit the differential action. Simultaneously with this, the coupling means is decoupled from the means for transmitting the torque to the rear wheels, thus establishing the two-wheel drive state.

In the invention, moreover, the first selective coupling mechanism includes: a mechanism for coupling the one side gear and the torque distributing mechanism when the case member and the one side gear are coupled by the second selective coupling mechanism; and a mechanism for coupling the one side gear and the torque distributing mechanism when the case member and the one side gear are decoupled by the second selective coupling mechanism.

With this construction, it is possible to set: the two-wheel drive state in which the transmission of the torque to the torque distributing mechanism is blocked when the case member and the one side gear are coupled by the second selective coupling mechanism to integrate the differential mechanism as a whole; the so-called "direct coupled" four-wheel drive state, in which the torque is transmitted to the torque distributing mechanism by the first selective coupling mechanism when the differential mechanism is integrated as a whole, that is, the four-wheel drive state in which the differential rotations between the front and rear wheels are not effected; and the four-wheel drive state in which the case member and the one side gear are decoupled by the second selective coupling mechanism to set the differential mechanism into the so-called "free state" and in which the torque is transmitted to the torque distributing mechanism by the first selective coupling mechanism, that is, the four-wheel drive state in which the differential rotations between the front and rear wheels are allowed by the differential mechanism.

In the power transmission system of the invention, still moreover, there are arrayed on a straight line: a first position at which the first selective coupling mechanism is set to decouple the one side gear and the torque distributing mechanism and at which the second selective coupling mechanism is set to couple the one side gear and the case member; a second position at which the first selective coupling mechanism is set to couple the one side gear and the torque distributing mechanism and at which the second selective coupling mechanism is set to couple the one side gear and the case member; and a third position at which the first selective coupling mechanism is set to couple the one side gear and the torque distributing mechanism and at which the second selective coupling mechanism is set to decouple the one side gear and the case member. The power transmission system further comprises a switching mechanism adapted to be linearly moved to and positioned at any of the first position to the third position for switching the individual selective coupling mechanisms.

With this construction, the switching mechanism linearly acts to move to the first to third positions so that the two-wheel drive state, the directly coupled four-wheel drive state and the four-wheel drive state allowing the differential rotations between the front and rear wheels.

In the invention, the differential mechanism can be constructed such that the planet pinion gear meshing with the paired side gears is held in sliding contact inside of the case member. Moreover, any two of the paired side gears and the case member output the torque to the front wheels and the rear wheels, and it is possible to provide a speed change mechanism around the other member for switching the high-low gear ratios. On the other hand, the other member may be the case member.

With this construction, the differential mechanism and the speed change mechanism are juxtaposed not in the axial direction but in the radial direction. With the differential mechanism being constructed so that the pinion gears meshing with the paired side gears are held in the case member, therefore, it is possible to effectively utilize the surplus space which is formed around the outer circumference in the radial direction. As a result, the power transmission system can be shortened in its entire axial length.

Here, the differential mechanism in the invention may be constructed such that the planet pinion gear held by the case member meshes simultaneously with both the paired side gears arranged on the common axis. Alternatively, the construction may be modified so that one of the paired planet pinion gears meshing with each other is meshed by one side gear whereas the other planet pinion gear is meshed by the other side gear.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 4A is a diagram showing one example of a switching mechanism to be adopted in the invention and a state where a moving block is at a first position;

FIG. 4B is a diagram showing one example of the switching mechanism to be adopted in the invention and a state where the moving block is at a second position;

DETAILED DESCRIPTION OF THE PREFERRED EMBODIMENTS

The invention will be described in connection with its specific embodiments. The power transmission system of the invention can be exemplified by either a power transmission system for the four-wheel drive vehicle which is based on a power transmission system of a front-engine rear-drive vehicle or a power transmission system for the four-wheel drive vehicle which is based on a power transmission system of a front-engine front-drive vehicle. The following embodiment will be described on the construction which is based on the power transmission system of the front-engine rear-drive vehicle.

Figure 1:
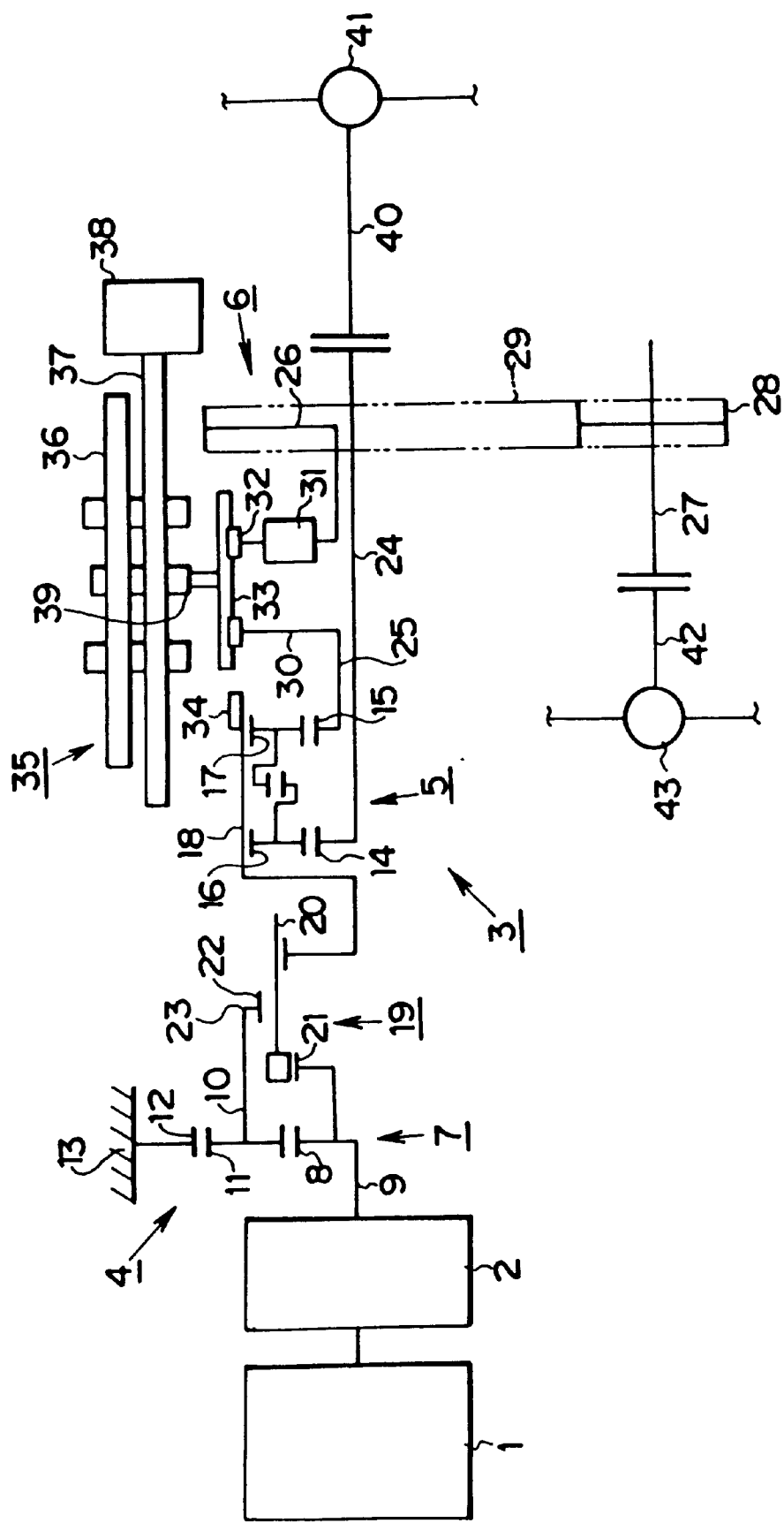
FIG. 1 is a skeleton diagram showing one embodiment schematically.

To the output side of a power source 1 such as an internal combustion engine or an electric motor, as shown in FIG. 1, there is coupled a stage type or a continuously variable type automatic or manual transmission 2 which has an output side coupled to a power transmission system 3 according to the invention. In the shown embodiment, the power transmission system 3 is provided with: a high-low switching unit 4 capable of switching two high and low stages, i.e., a high-speed stage for outputting an input power as it is, and a low-speed stage for outputting an input at a reduced speed; a differential mechanism (or a center differential) 5 having a torque sensing type differential limiting function; and a torque distributing mechanism (or a transfer) 6 for transmitting a torque to the front wheels.

The high-low switching unit 4 is constructed of a single-pinion type planetary gear mechanism 7 which has a sun gear 8 integrated with an input shaft 9 coupled to the (not-shown) output member of the transmission 2. A carrier 10 holds a pinion gear 11 rotatably on its own axis and revolvably around the carrier 10. The pinion gear 11 meshes with the sun gear 8. Moreover, a ring gear 12 or an internal gear meshing with the pinion gear 11 is arranged concentrically of the sun gear 8. The ring gear 12 is mounted on a stationary portion such as a housing 13. Thus: the sun gear 8 acts as an input element; the ring gear 12 a stationary element; and the carrier 10 an output element.

Adjacent to and coaxially with the high-low switching unit 4, there is arranged the differential mechanism 5. This differential mechanism 5 is constructed to perform a torque sensing type differential action to increase the differential limiting torque between those output members in accordance with an increase in the input torque. This construction can adopt the well-known one, as will be described with reference to the drawing. Two side gears 14 and 15 having equal external diameters are arranged adjacent to and coaxially with each other, and planet pinion gears 16 and 17 are arranged around those side gears 14 and 15, respectively, and in meshing engagement with each other. These planet pinion gears 16 and 17 have relatively large axial lengths and are arranged with a dislocation of their external diameter from each other in the circumferential direction and in meshing engagement with each other. Specifically, the first planet pinion gear 16 meshes with the first side gear 14, and the second planet pinion gear 17 meshes with the first planet pinion gear 16 and the second side gear 15.

On the other hand, these planet pinion gears 16 and 17 are enclosed therearound by a cylindrical differential case 18, which has a plurality of recesses formed in its inner circumference and extending in the axial direction of the circular section so that they hold the aforementioned individual planet pinion gears 16 and 17 in sliding contact with their inner circumferences. Therefore, the individual planet pinion gears 16 and 17 are constructed to revolve around the sun gears 14 and 15 while being pushed by the inner circumferences of the recesses as the differential case 18 rotates on its center axis. As the torque is inputted from the power source 1 through the differential case 18, the facial pressure of the frictional (or sliding) portions rises according to that input torque. When the two side gears 14 and 15 have different speeds in this state, the planet pinion gears 16 and 17 rotate on their axis to generate a frictional force between themselves and the differential case 18. On the other hand, the planet pinion gears 16 and 17 and the side gears 14 and 15 have an angle of torsion so that a thrust force (i.e., a force in the axial direction) is generated according to the input torque. Then, the frictional forces are generated between a thrust washer Ws and the side gears 14 and 15. As a result, a differential limitation is made according to the input torque mainly by those frictional forces. Thus, the differential case 18 corresponds to the input member of the invention, and the two side gears 14 and 15 correspond to the output members of the invention.

Between this differential mechanism 5 and the high-low switching unit 4, there is interposed a switching mechanism 19 for switching members to be coupled to the differential case 18. This switching mechanism 19 is provided with: a sleeve 20 meshing with a spline formed in the extension of the differential case 18 on the side of the high-low switching unit 4; a spline 21 formed in the outer circumference of the boss portion of the sun gear 8 and engaging with the spline of the inner circumference of the leading end of the sleeve 20; and a spline piece 23 made of a cylindrical member integrated with the carrier 10 and having such a spline 22 in its inner circumference as to engage with the spline in the outer circumference of the sleeve 20. When this sleeve 20 is moved back and forth in the crosswise directions of FIG. 1 by a manually operated lever and a shift fork (although both are not shown), moreover, it is brought into engagement with the spline 21 of the sun gear 8 to couple the sun gear 8 to the differential case 18, or the sleeve 20 is brought into engagement with the spline 22 of the spline piece 23 to couple the carrier 10 to the differential case 18.

The side gear 14 on the lefthand side of FIG. 1 is integrally mounted on a drive shaft 24, as arranged on its center axis, on the rear-wheel side, and the other side gear 15 is integrally mounted on a cylindrical shaft 25 which is rotatably fitted on the outer circumference of the drive shaft 24. This drive shaft 24 corresponds to the rear-wheel side drive member of the invention, and the cylindrical shaft 25 corresponds to the front-wheel side drive member of the invention. The torque distributing mechanism 6 for transmitting the torque to the front-wheel side is constructed to transmit from its cylindrical shaft 25 so that it is arranged on the side opposed in the axial direction to the high-low switching unit 4 across the differential mechanism 5.

Specifically, a drive sprocket 26 is rotatably arranged around-the drive shaft 24 and adjacent to the differential mechanism 5, and a driven sprocket 28 is integrally mounted on a front-wheel drive shaft 27 arranged in parallel with the drive shaft 24. A chain 29 is made to run on those sprockets 26 and 28. There are provided a first selective coupling mechanism for coupling the drive sprocket 26 and the cylindrical shaft 25 selectively and a second selective coupling mechanism for integrating the differential mechanism 5 as a whole.

These coupling mechanisms will be specifically described in the following. With the outer circumference of the cylindrical shaft 25, there is integrally formed a differential lock hub 30 which has an external diameter substantially equal to that of the differential case 18 and which has a spline formed in its outer circumference. On the outer circumference side of the boss portion protruded from the drive sprocket 26 toward the differential mechanism 5, on the other hand, there is disposed a synchro mechanism 31 such as a triple-cone type synchronizer. A spline 32 on the outer circumference side of the synchro mechanism 31 is arranged adjacent to and coaxially with the differential lock hub 30. There is further provided a drive sleeve 33 for moving on the outer circumference sides of those differential lock hub 30 and spline 32 in the axial direction thereby to bring them into selective engagement with the spline 32. These differential lock hub 30, synchro mechanism 31 and drive sleeve 33 construct a first selective coupling mechanism.

In the leading end portion of the outer circumference of the differential case 18, i.e., the outer circumference of the end portion on the side of the differential lock hub 30, there is formed a spline 34, which is engaged by the spline formed in the inner circumference of the drive sleeve 33. Thus, the spline 34 in the outer circumference of the differential case 18, the differential lock hub 30 and the drive sleeve 33 construct a second selective coupling mechanism.

Here, the drive sleeve 33 is made so long as to simultaneously engage with the three members: the spline 34 in the outer circumference of the differential case 18; the spline in the outer circumference of the differential lock hub 30; and the spline 32 of the synchro mechanism 31. On the other hand, the stroke is made so long as to extend from a lefthand end position, at which the drive sleeve 33 engages with the two of the spline 34 in the outer circumference of the differential case 18 and the differential lock hub 30, and to a righthand end position at which the same engages with the two of the differential lock hub 30 and the spline 32 in the synchro mechanism 31. Moreover, the positioning occurs at three positions: those two lefthand and righthand limit positions; and an intermediate position at which the drive sleeve 33 engages with the spline 34 of the differential case 18, the differential lock hub 30 and the spline 32 at the same time.

As a device for driving those first and second selective coupling mechanism, there is provided the so-called "linear moving type" switching mechanism 35 which can perform the positioning operations at three positions arrayed on a straight line. In the vicinity of the outer circumference side of the drive sleeve 33, more specifically, there are arranged a stationary rod 36 which is in parallel with the axis of the drive sleeve 33, and a moving rod 37 which can move in the axial direction. This moving rod 37 is connected to an actuator 38. On these rods 36 and 37, on the other hand, there is slidably fitted a moving block 39 which is equipped with a (not-shown) fork engaging with the drive sleeve 33 in the axial direction. Between the moving block 39 and the individual rods 36 and 37, moreover, there are provided: a mechanism for coupling the moving block 39 and the individual rods 36 and 37 integrally in the leftward direction at a predetermined leftward position in FIG. 1; a mechanism for coupling the moving block 39 and the individual rods 36 and 37 integrally in the rightward direction at a predetermined rightward position in FIG. 1; and a mechanism for coupling the moving block 39 and the stationary rod 36 integrally at an intermediate portion between those lefthand and righthand limit positions. By moving the moving rod 37 axially by the actuator 38, moreover, the moving block 39 and the drive sleeve 33, as moved by the former, are moved to and positioned at the three positions: the predetermined leftward limit position; the predetermined rightward limit position; and the intermediate position of FIG. 1. Here, these mechanisms will be specifically described hereinafter.

Here, the rear-wheel drive shaft 24 is coupled to the (not-shown) rear wheels through a propeller shaft 40 and a rear-wheel differential 41, and the front-wheel drive shaft 27 is coupled to the (not-shown) front wheels through a propeller shaft 42 and a front-wheel differential 43. On the other hand, the actuator 38 is constructed to be activated by a switching operation.

The actions of the power transmission system thus constructed will be described in the following. This power transmission system can set: a two-wheel drive state (H2); a four-wheel drive state (H4) having no torque amplifying function but accompanied by a front-rear wheel differential function; a four-wheel drive state (L4) accompanied by both the torque amplifying function and the front-rear wheel differential function; a four-wheel drive state (H4L) not having the torque amplifying function but inhibiting the front-rear wheel differential function; and a four-wheel drive state (L4L) accompanied by the torque amplifying function but inhibiting the front-rear wheel differential function. First of all, the two-wheel drive state will be described. In this drive state, the input torque is not amplified so that the high-low switching unit 4 is set to a high-speed state. Specifically, the sleeve 20 moves leftward of FIG. 1 to bring its leading end portion into engagement with the spline 21 formed integrally with the sun gear 8, thereby to couple the sun gear 8 and the differential case 18 or the input element in the differential mechanism 5. As a result, the power, as outputted from the transmission 2, is transmitted as it is from the sun gear 8 to the differential case 18. In other words, there occurs neither a speed reduction in the high-low switching unit 4 nor an according amplification of the torque.

On the other hand, the differential mechanism 5 and the torque distributing mechanism 6 are decoupled by the aforementioned first selective coupling mechanism. Specifically, the moving rod 37 is moved to the leftward limit position of FIG. 1 by the actuator 38. Together with this moving rod 37, the moving block 39 moves to the lefthand limit position so that the drive sleeve 33 moves leftward of FIG. 1 to engage with the spline 34 formed in the outer circumference of the differential case 18 and the differential lock hub 30 thereby to integrate them in the rotating direction. In this case, the differential lock hub 30 is integrated with the cylindrical shaft 25, and this cylindrical shaft 25 is integrated with one side gear 15. When the differential lock hub 30 is coupled to the differential case 18, therefore, the two rotary elements in the differential mechanism 5 are integrated to establish the so-called "locked state" in which the differential mechanism 5 rotates in its entirety.

As a result, the torque, as inputted to the differential mechanism 5, is transmitted as it is from the other side gear 14 only to the drive shaft 24 for the rear wheels so that it is transmitted to the rear wheels through the propeller shaft 40 and the differential 41. In short, there is established the two-wheel drive state in which only the rear wheels act as the drive wheels.

With the high-low switching unit 4 being held in the aforementioned high-speed state, on the other hand, the moving rod 37 is moved to the righthand limit position of FIG. 1 by the actuator 38. Together with the moving rod 37, the moving block 39 then moves rightward of FIG. 1 so that the drive sleeve 33 is set in the righthand limit position. In this state, the drive sleeve 33 engages with the differential lock hub 30 and the spline 32 of the synchro mechanism 31 so that one side gear 15 is coupled through the cylindrical shaft 25 and the synchro mechanism 31 to the drive sprocket 26 in the torque distributing mechanism 6. In short, one side gear 15 is coupled through the cylindrical shaft 25 to the power transmission line on the front-wheel side, and the other side gear 14 is coupled to the drive shaft 24 on the rear-wheel side, so that the torque is transmitted to both the front and rear wheels, thus establishing the four-wheel drive state.

In this case, the torque is inputted to the differential case 18 of the differential mechanism 5 so that the individual planet pinion gears 16 and 17 are pushed to revolve by their holding differential case 18. Since these planet pinion gears 16 and 17 are sandwiched between the differential case 18 and the individual side gears 14 and 15, the individual side gears 14 and 15 are rotated by the torque transmitted thereto through the planet pinion gears 16 and 17. If the front wheels and the rear wheels are different between their rotating speeds in this state, the individual planet pinion gears 16 and 17 rotate on their axes so that the differential rotations of the individual side gears 14 and 15 are absorbed. In short, the four-wheel drive state (H4) is established allowing the differential rotations of the front and rear wheels.

With this rotational difference of the front and rear wheels, the individual planet pinion gears 16 and 17 rotate on their axes in the differential case 18 so that a frictional resistance is caused between the planet pinion gears 16 and 17 and the inner face of the differential case 18. As described hereinbefore, on the other hand, the individual gears 14, 15, 16 and 17 have the angle of torsion so that the thrust forces are generated as the torque is transmitted, thereby to generate the frictional forces at the thrust washer Ws. As a result, these frictional forces act in the direction to suppress the rotations of the planet pinion gears 16 and 17, thus causing the torque sensing type differential limiting actions.

When the two-wheel drive state is switched to the four-wheel drive state, as described above, during the running in the two-wheel drive state, the torque distributing mechanism 6 couples, when rotated by the torque inputted from the front wheels, the differential lock hub 30 and the drive sprocket 26 in a torque transmitting manner. Even in this case, the drive sleeve 33 can be smoothly brought into engagement with the spline 32 by the synchro mechanism 31 owned by the construction thus far described, so that the two-wheel drive state can be smoothly switched to the four-wheel drive state.

Here will be described the four-wheel drive state (H4L) inhibiting the differential rotations between the front and rear wheels. This drive state is set to avoid a situation in which the so-called "off-torque" is caused by one wheel having missed the road to transmit no torque to the other wheel. In order to set this drive state, the moving rod 37 is moved to the so-called "intermediate position" by the actuator 38. At this intermediate position, the moving block 39 is engaged with the stationary rod 36 but disengaged from the moving rod 37 so that the moving block 39 is positioned at the predetermined intermediate position. Together with the moving block 39, moreover, the drive sleeve 33 is moved to the inter-mediate position where it engages with the three members: the spline 34 in the differential case 18, the differential lock hub 30 and the synchro mechanism 31 on the side of the drive sprocket 26 and integrate them in the rotating direction.

When the differential case 18 and the differential lock hub 30 are coupled, as described hereinbefore, the input element or the differential case 18 and the output element or the side gear 15 are coupled to integrate the differential mechanism 5 as a whole so that the torque inputted to the differential mechanism 5 is outputted as it is, to establish no differential action. In this state, one side gear 15 is coupled through the cylindrical shaft 25 and the synchro mechanism 31 to the drive sprocket 26 so that the torque is transmitted to the front wheels, too, to establish the four-wheel drive state (H4L).

When the high-low switching unit 4 is switched to the low-speed state, moreover, there is established the four-wheel drive state (L4L) accompanied by the torque amplifying function and inhibiting the differential rotations between the front and rear wheels. Specifically, the sleeve 20 in the high-low switching unit 4 is moved rightward of FIG. 1 to disengage its leading end portion from the spline 21 in the sun gear 8 and to engage it with the spline 22 in the spline piece 23 integral with the carrier 10. As a result, in the single-pinion type planetary gear mechanism constructing the high-low switching unit 4: the sun gear 8 acts as the input element; the ring gear 12 acts as the stationary element; and the carrier 10 acts as the output element, so that the carrier 10 rotates while being decelerated with respect to the sun gear 8. As a result, the torque to be outputted through the carrier 10 is higher than the torque to be inputted to the sun gear 8, so that a torque amplifying action is thus established. The torque is inputted from that carrier 10 to the differential mechanism 5 so that the drive torques at the front and rear wheels are raised to enhance the runability on a rough road and the escapability from a stuck state.

Here, by bringing the high-low switching unit 4 into the aforementioned low-speed state and the differential mechanism 5 into the aforementioned free state, there can be set the four-wheel drive state (L4) in which the torque amplifying function is established by the high-low switching unit 4 and in which the differential rotations between the front and rear wheels are allowed by the differential mechanism 5.

Figure 2:
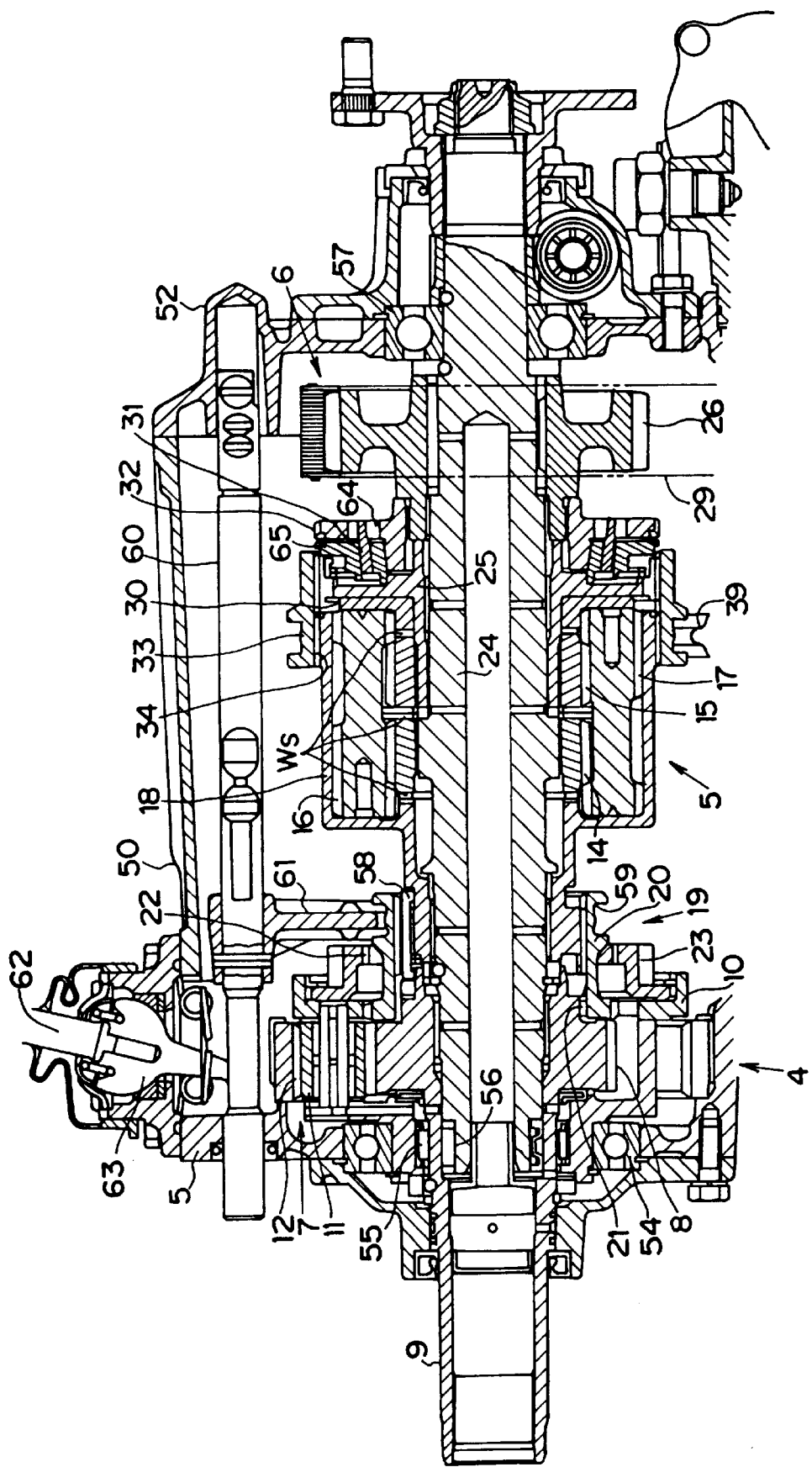
FIG. 2 is a sectional view showing one portion of the embodiment of the invention.
Figure 3:
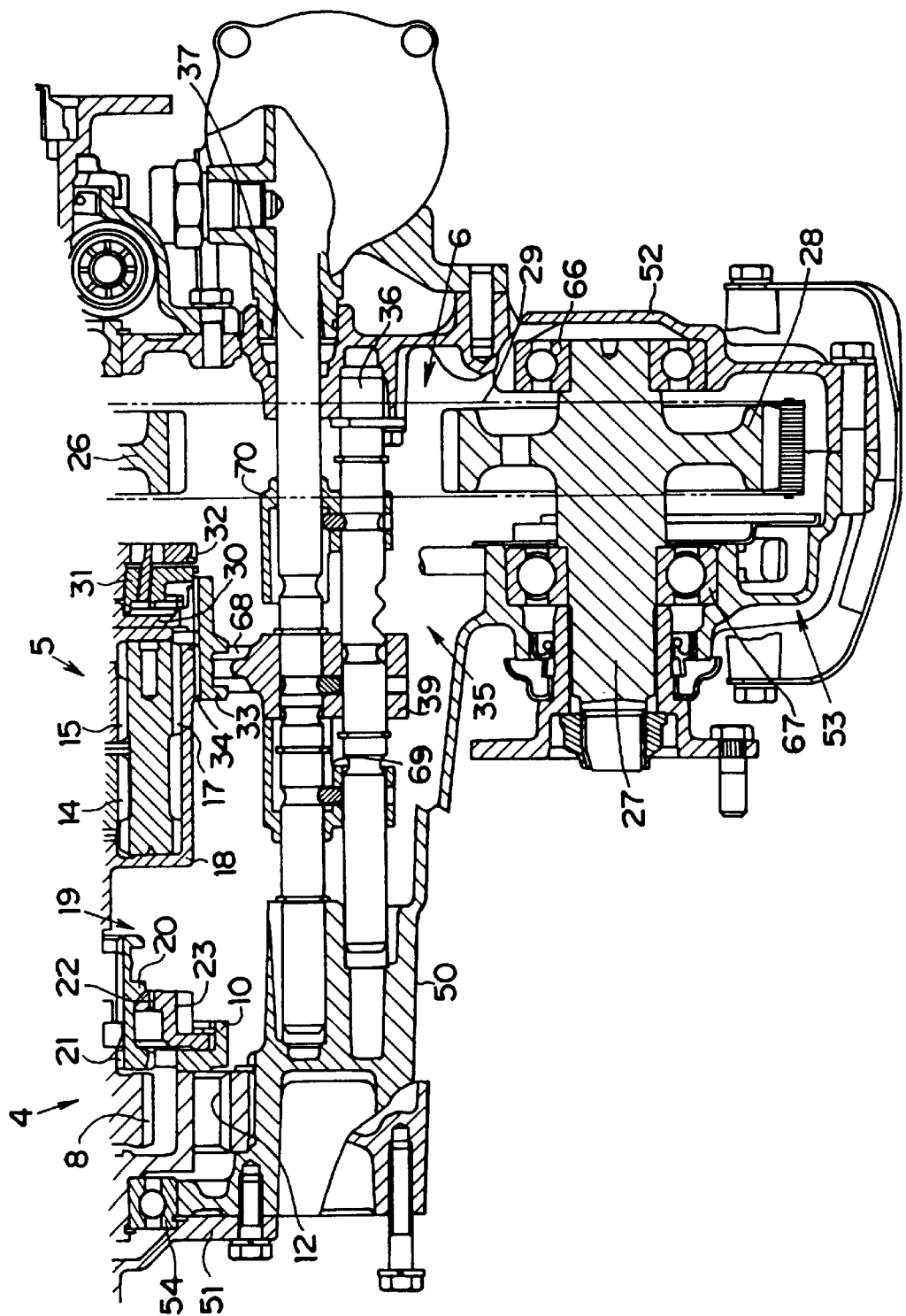
FIG. 3 is a sectional view showing the other portion of the embodiment of the invention.

Here will be described a more specific embodiment of the invention. In the following specific embodiment, the members identical or corresponding to those schematically shown in FIG. 1 will be designated the same reference numerals as those in FIG. 1, so that their repeated description may be omitted. FIGS. 2 and 3 are sectional views showing one embodiment exemplifying the invention. To the both end portions of a main housing 50, there are individually attached end covers 51 and 52. At one end portion (on the rear side) of the main housing 50 and the end cover 52 attached to that end portion, there is formed a protrusion 53 which is protruded radially outward for housing a portion of the aforementioned torque distributing mechanism 6.

The boss portion of the carrier 10 constructing the high-low switching unit 4 is extended through the end cover 51 which is attached to the other end portion (on the front side) of the main housing 50 and is rotatably held by a bearing 54. On the other hand, the input shaft 9 integral with the sun gear 8 is a hollow cylindrical shaft extended axially through the carrier 10 and rotatably held by a bearing 55. The rear-wheel side drive shaft 24, as arranged coaxially with that input shaft 9, is inserted at its front side end portion into the input shaft 9 and rotatably held by a bearing 56 and is extended at its other end portion (on the rear side) through the end cover 52 and rotatably supported by a bearing 57. Moreover, the ring gear 12 is splined and fixed on the cylindrical protrusion which is formed on the inner face of the end cover 51.

The spline 21 is formed in the portion adjacent to the sungear 8 on the outer circumference of the input shaft 9, i.e., in the boss portion of the sun gear 8. With the carrier 10, there is integrated the spline piece 23 which is provided in its inner circumference with the spline 22 having a larger diameter than that of the spline 21. This spline 22 in the spline piece 23 is arranged axially apart from the spline 21 in the sun gear 8.

The extension (or the boss portion) of the differential case 18 in the differential mechanism 5 is arranged being adjacent to the sun gear 8, and the sleeve 20 is so fitted through a key 58 on the outer circumference of that extension as to move only in the axial direction. In the inner circumference and the outer circumference of the leading end portion (on the side of the sun gear 8) of that sleeve 20, there are formed splines which mesh with the individual splines 21 and 22. At the rear end portion of the sleeve 20, on the other hand, there is formed an engagement portion 59 for the shift fork.

A shift rod 60, as slidably held at its two front and rear end portions by the individual end covers 51 and 52, is arranged around the high-low switching unit 4 and in parallel with the center axis of the same. This shift rod 60 is integrated with a shift fork 61 engaging with the engagement portion 59 of the sleeve 20 and is engaged with the leading end portion of a manually operated shift lever 62. This shift lever 62 is given a well-known structure and is held at its intermediate portion in a rocking manner by a spherical receiving seat 63 mounted on the outer circumference of the main housing 50.

The differential case 18 in the differential mechanism 5 is a cylindrical member which is mounted at its one end portion on the sleeve 20 and opened at its other end portion. In the inner circumference of the differential case 18, there are formed equidistantly in the circumferential direction a plurality of pairs of recesses for retaining the aforementioned first and second planet pinion gears 16 and 17. On the other hand, the first side gear 14 meshing with the first planet pinion gear 16 and the second side gear 15 meshing with the second planet pinion gear 17 are arranged in the differential case 18 and adjacent to each other in the axial direction. Moreover, the first side gear 14 is splined to the rear-wheel side drive shaft 24, and the second side gear 15 is splined to the cylindrical shaft 25 which is rotatably fitted on the outer circumference of the drive shaft 24.

The individual planet pinion gears 16 and 17 have teeth formed on their two axially end portion sides. The teeth, as formed on one end portion side of the first planet pinion gear 16, are made wider than those of the first side gear 14 and meshed with the first side gear 14 and are protruded at its axial end portion from the first side gear 14. And, the teeth, as formed on the other end portion side, pass the second side gear 15 in the axial direction and do not mesh with the second side gear 15. On the other hand, the teeth of the end portion of the second planet pinion gear 17 on the side of the first side gear 14 pass the first side gear 14 in the axial direction and mesh not with the first side gear 14 but with the first planet pinion gear 16. And, the teeth, as formed in the end portion on the side of the second side gear 15, are made wider than those of the second side gear 15 and meshed with the second side gear 15 and are so protruded at its axial end portion from the second side gear 15 that the protrusion is meshed with the teeth of the end portion of the first planet pinion gear 17 on the side of the second side gear 15.

When the individual planet pinion gears 16 and 17 revolve while being pushed by the differential case 18 but do not rotate on their axes, therefore, the differential mechanism 5 rotate in its entirety so that the individual side gears 14 and 15 rotate at the same speed and in the same direction. When the individual side gears 14 and 15 rotate relative to each other, that is, when the differential rotations take place between the individual side gears 14 and 15 acting as the output elements, on the other hand, the individual planet pinion gears 16 and 17 rotate on their axes to allow or absorb those differential rotations. In this case, the individual planet pinion gears 16 and 17 rotate while sliding on the inner face of the differential case 18, so that the frictional forces to be generated on the sliding faces act as differential limiting forces to suppress the differential rotations between the individual side gears 14 and 15.

On the open end side of the differential case 18, there is arranged the differential lock hub 30 which is radially protruded from the cylindrical shaft 25. The external diameter of the differential lock hub 30 is set substantially equal to that of the open end side of the differential case 18. In the outer circumference of the open end side of the differential case 18, there is formed the spline 34 for engaging the drive sleeve 33 which is splined to the outer circumference of the differential lock hub 30. When the drive sleeve 33 engages with the spline 34 formed in the differential case 18, the cylindrical shaft 25 integral with the second side gear 15, the differential lock hub 30 and the differential case 18 are integrated in the rotating direction so that the differential case 18 or the input element of the differential mechanism 5 and the second side gear 15 or one output element are integrated to integrate the differential mechanism 5 as a whole. In short, the spline 34 formed in the outer circumference of the differential case 18, the drive sleeve 33 and the differential lock hub 30 construct the second selective coupling mechanism of the invention.

The torque distributing mechanism (or the transfer) 6 in the specific embodiment shown in FIGS. 2 and 3 is constructed to include the drive sprocket 26, the driven sprocket 28 and the silent chain 29 made to run on those sprockets 26 and 28. Of these, the drive sprocket 26 is arranged on the axially opposite side to the differential mechanism 5 across the differential lock hub 30 and is rotatably held on the outer circumference of the rear-wheel side drive shaft 24.

Between the drive sprocket 26 and the differential lock hub 30, there is interposed a triple cone type synchronous coupling mechanism (or the synchro mechanism) 31. On the boss portion of the drive sprocket 26, more specifically, there is so mounted a flange member 64 having an external diameter substantially equal to the internal diameter of the drive sleeve 33 (or substantially equal to the external diameter of the differential lock hub 30 and the differential case 18) that it may integrally rotate. The outer circumference of the drive sprocket 26 is formed with the spline 32 for engaging the drive sleeve 33. Between the flange member 64 and the differential lock hub 30, there is so arranged a spline piece 65 having two tapered synchronizer rings on its inner circumference that it can slightly move in the axial direction. In the outer circumference of the spline piece 65, there is formed a spline which is engaged with the drive sleeve 33.

As the drive sleeve 33 moves toward the drive sprocket 26, therefore, the spline piece 65 is pushed toward the drive sprocket 26 by the drive sleeve 33 so that its tapered face on the inner circumference comes into frictional contact to transmit the torque to the drive sprocket 26 gradually. As a result, the drive sprocket 26 and the differential lock hub 30 are gradually synchronized in their rotating speeds. As the drive sleeve 33 further moves, moreover, it is splined to the spline piece 65 and the flange member 64 to couple the differential lock hub 30 and the flange member 64, that is, the cylindrical shaft 25 or the front-wheel side drive member and the drive sprocket 26 or the input member of the torque distributing mechanism 6 in a torque transmittable manner. Thus, this synchro mechanism 31 corresponds to the first selective coupling mechanism of the invention.

The driven sprocket 28 or the output member of the torque distributing mechanism 6 is rotatably held in parallel with the drive sprocket 26 in the protrusion 53 which is formed by the main housing 50 and one end cover 52. Specifically, the driven sprocket 26 is formed integrally with the front-wheel drive shaft 27, which is rotatably held in the protrusion 53 through a pair of bearings 66 and 67.

The drive sleeve 33 is a member shared between the first selective coupling mechanism and the second selective coupling mechanism and is linearly moved and positioned: at a first position where the differential mechanism 5 is directly coupled (or locked) (or the second selective coupling mechanism is applied); at a second position where the differential mechanism 5 is directly connected and where the cylindrical shaft 25 and the drive sprocket 26 are coupled to establish the four-wheel drive state (or the first and second selective coupling mechanisms are applied); and at a third position where the differential mechanism 5 is released (or freed) and where the cylindrical shaft 25 and the drive sprocket 26 are coupled to establish the four-wheel drive state (or the first selective coupling mechanism is released whereas the second selective coupling mechanism is applied).

Here will be further described the switching mechanism 35 for moving the drive sleeve 33 linearly and positioning it at the above-specified three positions. This switching mechanism 35 is provided with the stationary rod 36 and the moving rod 37 which are arranged in parallel with the axis of the drive sleeve 33. The moving rod 37 is connected to the linear moving type actuator 38. On these individual rods 36 and 37, on the other hand, there is sidably fitted the moving block 39 which is integrally provided with a shift fork 68 engaged with the drive sleeve 33 in the axial direction. On the lefthand and righthand sides of the moving block 39, moreover, there are arranged pushing blocks 69 and 70 of symmetric shapes, which are slidably fitted on the individual rods 36 and 37.

These individual blocks 39, 69 and 70 are members having the so-called "spectacle section", which are provided at their intermediate portions with partitions for defining cylindrical portions to be fitted on the individual rods 36 and 37. The blocks 39, 69 and 70 are further provided with through holes extending through the partitions and retaining lock pins 71, 72 and 73 having a diameter larger than the thickness of the partitions. In the moving rod 37, on the other hand, there are formed at a predetermined axial spacing four annular grooves (i.e., recesses in portions of the outer circumference) 74*a*, 74*b*, 74*c* and 74*d* for fitting the lock pins 71, 72 and 73 to prevent them from protruding toward the stationary rod 36. In the stationary rod 36, on the other hand, there are formed at a predetermined axial spacing three annular grooves (i.e., recesses in portions of the outer circumference) 75a, 75b and 75c for fitting the lock pins 71, 72 and 73 to prevent them from protruding toward the moving rod 37. Here, the spacing of the annular grooves 74a, 74b, 74c and 74d in the moving rod 37 and the spacing of the annular grooves 75a, 75b and 75c in the stationary rod 36 are so set as to perform the actions, as will be described hereinafter.

On the moving rod 37, between the lefthand end annular groove 74a and the lefthand second annular groove 74b of the drawing and between the lefthand third annular groove 74c and the righthand end annular groove 74d of the same, moreover, there are fitted snap rings (or engagement members) 76a and 76b for interposing the moving block 39 at a predetermined spacing and for engaging with the moving block 39 to push it in the axial direction. On the stationary rod 36, on the other hand, there are fitted, from the lefthand side of the drawing: a snap ring (or an engagement member) 77a for abutting against the pushing block 69 to decide the lefthand end position (or the first position) of the same; a snap ring (or an engagement member) 77b for abutting against the pushing block 69 to decide the rightward moving limit position (or the second position) of the same; and a snap ring (or an engagement member) 77c for abutting against the other pushing block 70 to decide the righthand end position (or the third position) of the same.

Figure 4C:
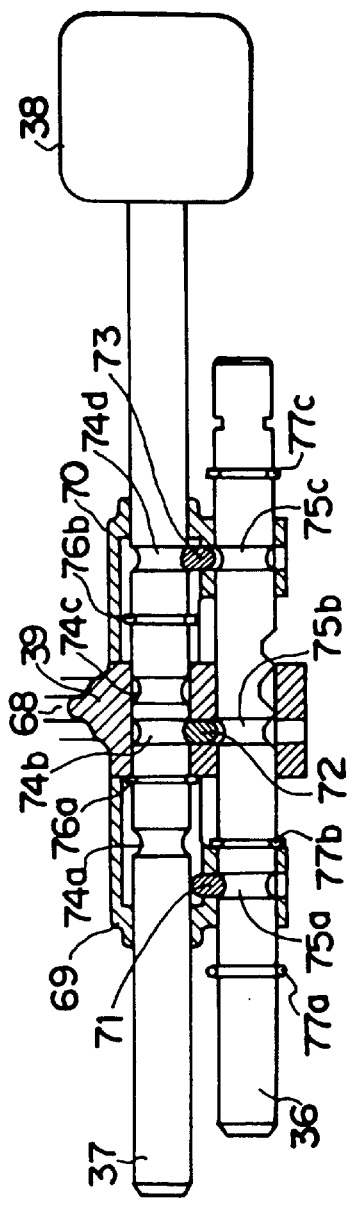
FIG. 4C is a diagram showing one example of the switching mechanism to be adopted in the invention and another state where the moving block is at the second position.

The actions of the switching mechanism 35 thus constructed will be described with reference to FIGS. 4A to 4D. FIG. 4A shows the state where the drive sleeve 33 is set in the first position, that is, where the drive sleeve 33 engages with the spline 34 formed in the outer circumference of the differential case 18 and the differential lock hub 30 to set the differential mechanism 5 in the directly coupled state (or the locked state). In this state, the moving rod 37 is pushed leftward of the drawing by the actuator 38 so that the lock pin 71 held by the lefthand pushing block 69 is fitted in the lefthand end annular groove 74a of the moving rod 37. As a result, the pushing block 69 and the moving rod 37 are coupled.

On the other hand, the lock pin 72 held by the moving block 39 is fitted in the lefthand third annular groove 74c of the moving rod 37. As a result, the moving block 39 and the moving rod 37 are coupled. Moreover: the moving block 39 and the pushing block 69 abut against each other; the righthand snap ring 76b mounted on the moving rod 37 abuts; and the pushing block 69 abuts against the lefthand end snap ring 77a mounted on the stationary rod 36. In other words, the moving block 39 and the pushing block 69 are pushed leftward by the moving rod 37 and are engaged with and positioned by the snap ring 77a of the stationary rod 36.

When the moving rod 37 is moved rightward of FIG. 4A from that first position by the actuator 38, the moving block 39 and the pushing block 69 are moved rightward of FIG. 4A together with the moving rod 37 because they are coupled to the moving rod 37 through the lock pins 71 and 72 held thereby and the annular grooves 74a and 74c fitting the former. In short, the drive sleeve 33 is moved toward the synchro mechanism 31 by the shift fork 68 integrated with the moving block 39. Here in the other pushing block 70 located on the righthand side of FIG. 4A, the lock pin 73 held thereby is disengaged from any of the annular grooves of the moving rod 37 but is aligned with the righthand end annular groove 75c of the stationary rod 36. As a result, that lock pin 73 is fitted in the annular groove 75c of the stationary rod 36 so that the pushing block 70 is integrated with the stationary rod 36 and prevented from its movement.

When the moving block 39 moves to the second position where the differential mechanism 5 is directly coupled and where the drive sprocket 26 is coupled to the cylindrical shaft 25 to establish the four-wheel drive state. As shown in FIG. 4B, the moving block 39 then abuts against the righthand pushing block 70 of FIG. 4B. This pushing block 70 is integrated with the stationary rod 36 through the lock pin 73, as described hereinbefore, so that the moving block 39, i.e., the drive sleeve 33 is stopped at an abutting position against the pushing block 70 and is positioned.

In this state, the lock pin 72 held on the moving block 39 is aligned with the intermediate annular groove 75b in the stationary rod 36, and the lock pin 71 held on the lefthand pushing block 69 is aligned with the lefthand annular groove 75a in the stationary rod 36. Moreover, the lefthand pushing block 69 is engaged with the snap ring 77b mounted on the stationary rod 36 and is blocked from any further leftward movement.

When the moving rod 37 is moved further rightward from this second position by the actuator 38, therefore, the moving block 39 and the lefthand pushing block 69 are blocked from moving by the pushing block 70 on the righthand side of FIG. 4B, and their lock pins 71 and 72 enter the annular grooves 75a and 75b of the stationary rod 36 to disengage the moving rod 36, so that only the moving rod 37 moves leftward of FIG. 4B. In short, the moving block 39 and the drive sleeve 33 are left at the second position, but the moving rod 37 makes the so-called "free run".

When the moving rod 37 moves some distance as shown in FIG. 4C, the lefthand end annular groove 74a in the moving rod 37 comes out of the lock pin 71 held by the lefthand pushing block 69 so that the lock pin 71 is pushed into the annular groove 75a of the stationary rod 36. As a result, the lefthand pushing block 69 is engaged with and fixed by the stationary rod 36. On the other hand, the lefthand second annular groove 74b in the moving rod 37 is aligned with the position of the lock pin 72 held by the moving block 39 so that the lock pin 72 enters the annular groove 74b and escapes the annular groove 75b in the stationary rod 36. In short, the moving block 39 is integrated with the moving rod 37 and made movable with respect to the stationary rod 36. Moreover, the righthand end annular groove 74d in the moving rod 37 is aligned with the position of the lock pin 73 held in the righthand pushing block 70 so that the lock pin 73 enters the annular groove 74d of the moving rod 37 and integrates the pushing block 70 with the moving rod 37. Here, the righthand snap ring 76b on the moving rod 37 comes into abutting engagement with the moving block 39.

Figure 4D:
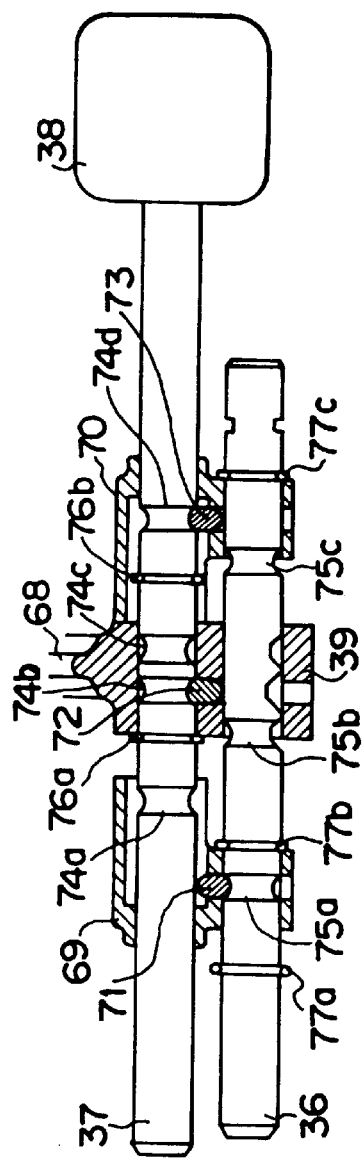
FIG. 4D is a diagram showing one example of the switching mechanism to be adopted in the invention and a state where the moving block is at a third position.

As the moving rod 37 further moves rightward of FIG. 4C, the moving block 39 and the righthand pushing block 70 move together with the moving rod 37. As shown in FIG. 4D, moreover, the pushing block 70 is prevented from its movement when it abuts against the righthand snap ring 77c mounted on the stationary rod 36. In short, the moving block 39 and the drive sleeve 33 coupled to the former through the shift fork 68 are positioned at the third position on the righthand side of the drawing.

When the moving rod 37 is moved leftward from the state of FIG. 4D, the individual components function in the sequence inverted from that of the aforementioned actions so that the moving block 39 and the drive sleeve 33 can be sequentially moved from the third position to the second position and the first position and can be positioned.

In the specific embodiment shown in FIGS. 2 and 3, therefore, the two-wheel drive state can also be set by coupling the differential case 18 and differential lock hub 30 by the drive sleeve 33 to integrate the differential mechanism 5 as a whole. The second selective coupling mechanism of the invention including the spline 34 of the differential case 18, the differential lock hub 30 and the drive sleeve 33 for setting those states is constructed by employing the components of the differential mechanism and arranged around the same so that the axial length of the whole system can be shortened and made compact by reducing the number of mechanisms arranged in the axial direction.

In the two-wheel drive state, on the other hand, the torque, as inputted to the differential case 18, is inputted from the differential case 18 through the differential lock hub 30 and the second side gear 15 to the differential mechanism 5 and is outputted to the rear-wheel side drive shaft 24. In addition, the torque is transmitted to cause the differential case 18 to push and revolve the first planet pinion gear 16 and accordingly to rotate the first side gear 14 and the rear-wheel side drive shaft 24. With the differential mechanism 5 constructed of a helical gear, moreover, a load is generated in the axial direction so that the torque is transmitted from the differential case 1 through the first side gear 14 to the rear-wheel side drive shaft 24. Since the two-wheel drive is thus established with the differential mechanism 5 being integrated (or differentially locked), the torque transmission in this state also takes place through the portion other than the teeth of any gear composing the differential mechanism 5 so that the input torque to the tooth faces in the differential mechanism 5 is lowered to reduce the restriction on the strength thereby to enhance the degree of freedom for the design.

With the construction shown in FIGS. 2 and 3, moreover, it is possible to set the two-wheel drive state, the four-wheel drive state inhibiting the differential rotations between the front and rear wheels, and the four-wheel drive state allowing the differential rotations between the front and rear wheels. Therefore, the drive state suited for the road surface state is selected to improve the power performance and the fuel consumption thereby to enhance the general purpose. Especially, the torque can be selectively raised by the high-low switching unit 4 so that the drive torque in the four-wheel drive state is increased to improve the runability on the rough road.

Moreover, the system shown in FIGS. 2 and 3 is constructed to set the individual drive states of the two-wheel drive and the four-wheel drive having the directly coupled differential mechanism 5 and the four-wheel drive having the freed differential mechanism 5, selectively by the switching mechanism 35 which has the so-called "biaxial construction" of the stationary rod 36 and the moving rod 37 and which can make the three positions arrayed on the straight line. As a result, the construction of the switching mechanism 35 and the construction for driving the former can be simplified to make the whole system compact.

Here, in the system shown in FIG. 1 or in the system shown in FIGS. 2 and 3, there is provided, on the back side in the torque transmitting direction with respect to the differential mechanism 5 for the torque sensing type differential limitation, the mechanism for switching the differential mechanism 5 to the free state and the locked state. The switching performance of the mechanism can be improved to reduce the size of the actuator for the switching actions.

In the individual systems thus far described, more specifically, the drive sleeve 33 is splined to the differential case 18 to lock the differential mechanism 5 thereby to set the four-wheel drive state inhibiting the differential rotations between the front and rear wheels, and the splined fitting is released to set the four-wheel drive state allowing the differential rotations between the front and rear wheels. In such one of the four-wheel drive states that the former differential mechanism 5 is locked, the torque to be generated in the drive sleeve 33 is a difference between the input torque and the differential limiting torque because the differential mechanism 5 for the torque sensing type differential limitation has the so-called "self-locking function" of the input torque. As a result, the pressure to act on the tooth face of the spline of the drive sleeve 33 is lowered. In the case of the latter four-wheel drive allowing the differential rotations between the front and rear wheels, on the other hand, what is generated in the drive sleeve is the front-wheel axial torque so that the pressure on the tooth face of the spline is further lowered.

With the construction in which the switching mechanism for locking/freeing the differential mechanism 5 is disposed upstream (in the torque transmitting direction) of the differential mechanism, on the contrary, the input torque always acts on the switching mechanism so that the member corresponding to that drive sleeve generates a high torque to raise the pressure of the tooth face. Because of the low face pressure of the systems thus far described according to the invention, the sliding resistance to the axial movement of the drive sleeve 33 is reduced so that the switching performance can be improved or that the actuator for generating the thrust force for the switching can be made of a small-sized one having a low output.

Figure 5A:
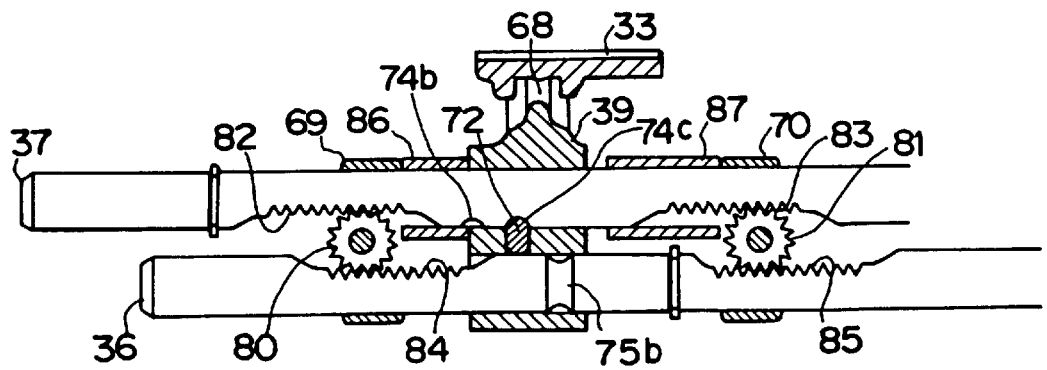
FIG. 5A is a diagram showing the other example of the switching mechanism to be adopted in the invention and a state where the moving block is at the first position.

Here, the invention can adopt the rack-and-pinion type differential mechanism as the switching mechanism 35, as shown in FIGS. 5A to 5D. In a mechanism exemplified here, the aforementioned individual pushing blocks 69 and 70 are equipped with pinions 80 and 81 in place of the lock pins, and racks 82, 83, 84 and 85 meshing with the pinions 80 and 81 are accordingly formed on the stationary rod 36 and the moving rod 37. In the moving rod 37, on the other hand, there are exclusively formed either two annular grooves for engaging with the lock pin 72 held by the moving block 39 or the recesses 74b and 74c partially in the outer face. Moreover, cylindrical collars 86 and 87 are arranged between the moving block 39 and the individual pushing blocks 69 and 70. FIG. 5A shows the state where the moving rod 37 is set at a first position or a lefthand limit position. In this state, the lock pin 72 held in the moving block 39 is pushed to engage with the recess 74c in the moving rod 37 by the outer circumference of the stationary rod 36 so that the moving rod 37 and the moving block 39 are integrated. In this state, the moving block 39 abuts against the lefthand pushing block 69 while clamping the collar 86. Leftward of FIG. 5A, therefore, the pushing block 69 holding the pinion 80 and the rack 82 meshed by the pinion 80 are integrated, and the other rack 84 is formed and fixed in the stationary rod 36, so that the rack-and-pinion type differential mechanism on the lefthand side of FIG. 5A is fixed as a whole. As a result, the moving block 39 is fixed with respect to the leftward direction of FIG. 5A and is positioned at the first position. In other words, the drive sleeve 33 is positioned at the first position or the lefthand limit position, thereby to establish the two-wheel drive state where the differential mechanism 5 is locked.

When the moving rod 36 is linearly moved from this state rightward of FIG. 5A by the aforementioned actuator, the moving block 39 moves rightward of FIG. 5A together with the moving rod 37 because it is integrated with the moving rod 37 by the lock pin 72. When the moving block 39 abuts against the pushing block 70 on the righthand of FIG. 5A while clamping the color 87, a spacing of one half of the axial movement of the moving block 39 is left between the pushing block 69 on the lefthand side of FIG. 5B and the collar 86. Since the individual pinions 80 and 81 and the racks 82, 83, 84 and 85 meshed by the pinions 80 and 81 construct the differential mechanism, more specifically, the movement of the pushing block 70 on the righthand side of the moving block 39 and the collar 87 is one half of that of the moving block 39 so that the moving block 39 catches up and abuts against the righthand pushing block 70 and the collar 87. On the other hand, the movement of the pushing block 69 on the lefthand side of FIG. 5B and the collar 86 is one half of that of the moving block 39 to make a spacing from the moving block 39.

Figure 5B:
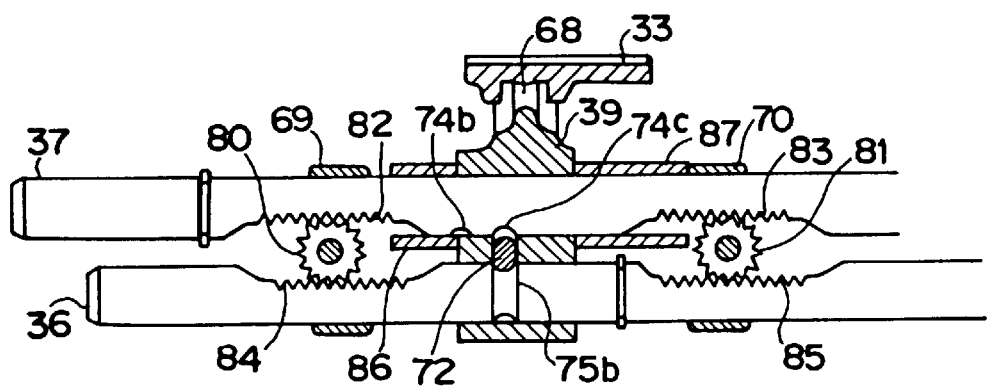
FIG. 5B is a diagram showing the other example of the switching mechanism to be adopted in the invention and a state where the moving block is at the second position.

When the moving block 39 and the drive sleeve 33 integrated with the former thus move to the second position, the lock pin 72 held by the moving block 39 is aligned with the annular groove 75b formed in the stationary rod 36, so that the lock pin 72 comes out from the recess 74c of the moving rod 37 and enters the annular groove 75b on the side of the stationary rod 36. In short, the moving block 39 and the moving rod 37 are decoupled. As a result, the moving rod 37 can exclusively move in the axial direction. When the moving rod 37 is further moved rightward of FIG. 5B by the actuator, therefore, the pinion 81 meshing with the rack 83 moves, while rotating on its axis, rightward of FIG. 5B. The movement of the pinion 81 in the rightward direction of FIG. 5B is one half of that of the moving rod 37. In this case, the differential mechanism on the lefthand side of FIG. 5B likewise acts so that the pinion 80 and the pushing block 69 holding the former move rightward and abut against the moving block 39 while clamping the collar 86. This state is shown in FIG. 5C.

Figure 5C:
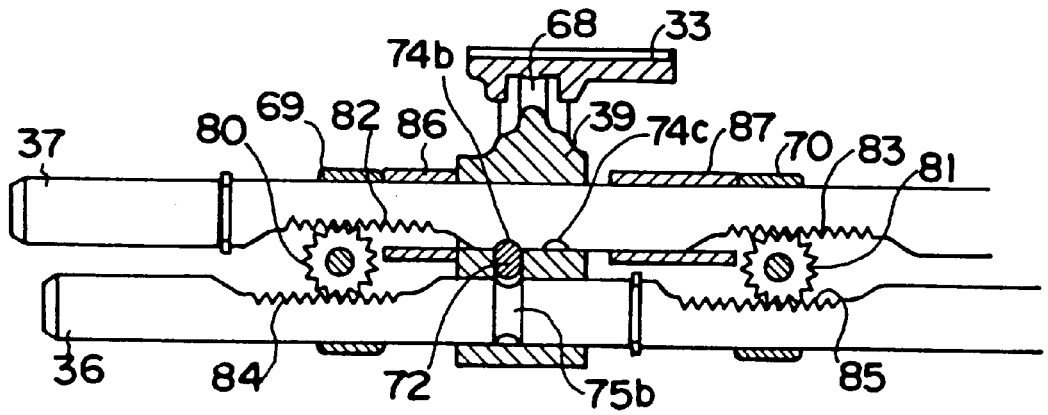
FIG. 5C is a diagram showing the other example of the switching mechanism to be adopted in the invention and another state where the moving block is at the second position.

When the moving rod 37 thus moves (to make the free run) from the state shown in FIG. 5B to the state shown in FIG. 5C, the righthand recess 74b formed in the moving rod 37 comes into alignment with the lock pin 72 held on the moving block 39, and this lock pin 72 enters the recess 74b on the side of the moving block 39, so that the moving rod 37 and the moving block 39 are integrated. In this state, a predetermined spacing is left between the righthand side of FIG. 5C of the moving block 39 and the collar 87 so that the moving block 39 can move rightward of FIG. 5C.

When the moving rod 37 is further moved rightward of FIG. 5C, the moving block 39 moves rightward of FIG. 5C together with the moving rod 37. Since the individual pinions 80 and 81 and racks 82, 83, 84 and 85 construct the differential mechanism in this case, the spacing between the collar 86 and the pushing block 69 gradually grows on the lefthand side of FIG. 5C with respect to the moving block 39. On the righthand side of FIG. 5C, on the other hand, the moving block 39 gradually catches up the pushing block 70 until the moving block 39 comes into abutment against the pushing block 70 across the collar 87, as shown in FIG. 5D.

Figure 5D:
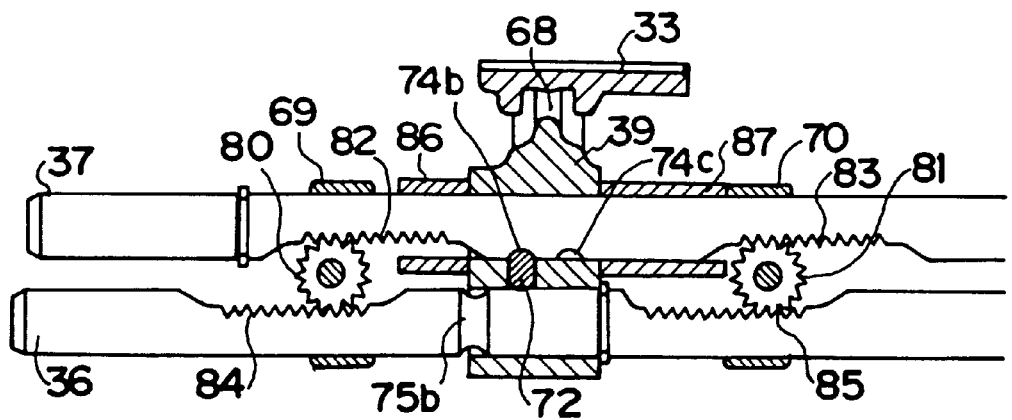
FIG. 5D is a diagram showing the other example of the switching mechanism to be adopted in the invention and another state where the moving block is at the third position.

In this state, the pushing block 70 holding the pinion 81 and the rack 83 meshed by the pinion 81 are integrated rightward of FIG. 5D, and the other rack 85 is formed and fixed in the stationary rod 36, so that the rack-and-pinion type differential mechanism on the righthand side of FIG. 5D is fixed as a whole. As a result, the moving block 39 is fixed rightward of FIG. 5D to set the third position. Specifically, the drive sleeve 33 is positioned at the righthand limit position or the third position to establish the four-wheel drive state where the differential mechanism 5 is freed.

When the moving rod 37 is moved leftward from the state of FIG. 5D, the individual components function in the sequence inverted from that of the aforementioned actions. As a result, the moving block 39 and the drive sleeve 33 can be moved sequentially from the third position to the second position and the first position and can be positioned.

Even with the switching mechanism having the construction shown in FIGS. 5A to 5D, moreover, the moving block 39 and the drive sleeve 33 integrated with the former can be sequentially moved to and positioned at the three positions arranged on the straight line by moving the moving rod 37 linearly by the single actuator. As a result, the mechanism can be made compact for selecting and setting the two-wheel drive state, the directly coupled four-wheel drive state inhibiting the differential rotations between the front and rear wheels, and the four-wheel drive state allowing the differential rotations between the front and rear wheels.

In either the switching mechanism of the construction shown in FIGS. 4A to 4D or the switching mechanism of the construction shown in FIGS. 5A to 5D, on the other hand, there is prepared the so-called "free running section" in which only the moving rod 37 moves at the switching time from the intermediate position to either the lefthand or righthand position. Even with an error in the movement of the moving rod 37 with respect to the intermediate position, therefore, the moving block 39 and the drive sleeve 33 can be moved to and positioned at the predetermined position. In other words, the construction is enabled to allow the action errors of the moving rod 37 and the actuator 38 for driving the former, so that a highly precise actuator can be dispensed with to lower the cost therefor. Since the construction is further enabled to switch the three positions by moving the moving rod 37 by one half of the entire movement at the two steps, it is unnecessary to move/stop the actuator at the three positions or to make the forward and backward movements different. This unnecessariness makes it possible to employ the actuator of the prior art.

Figure 6:
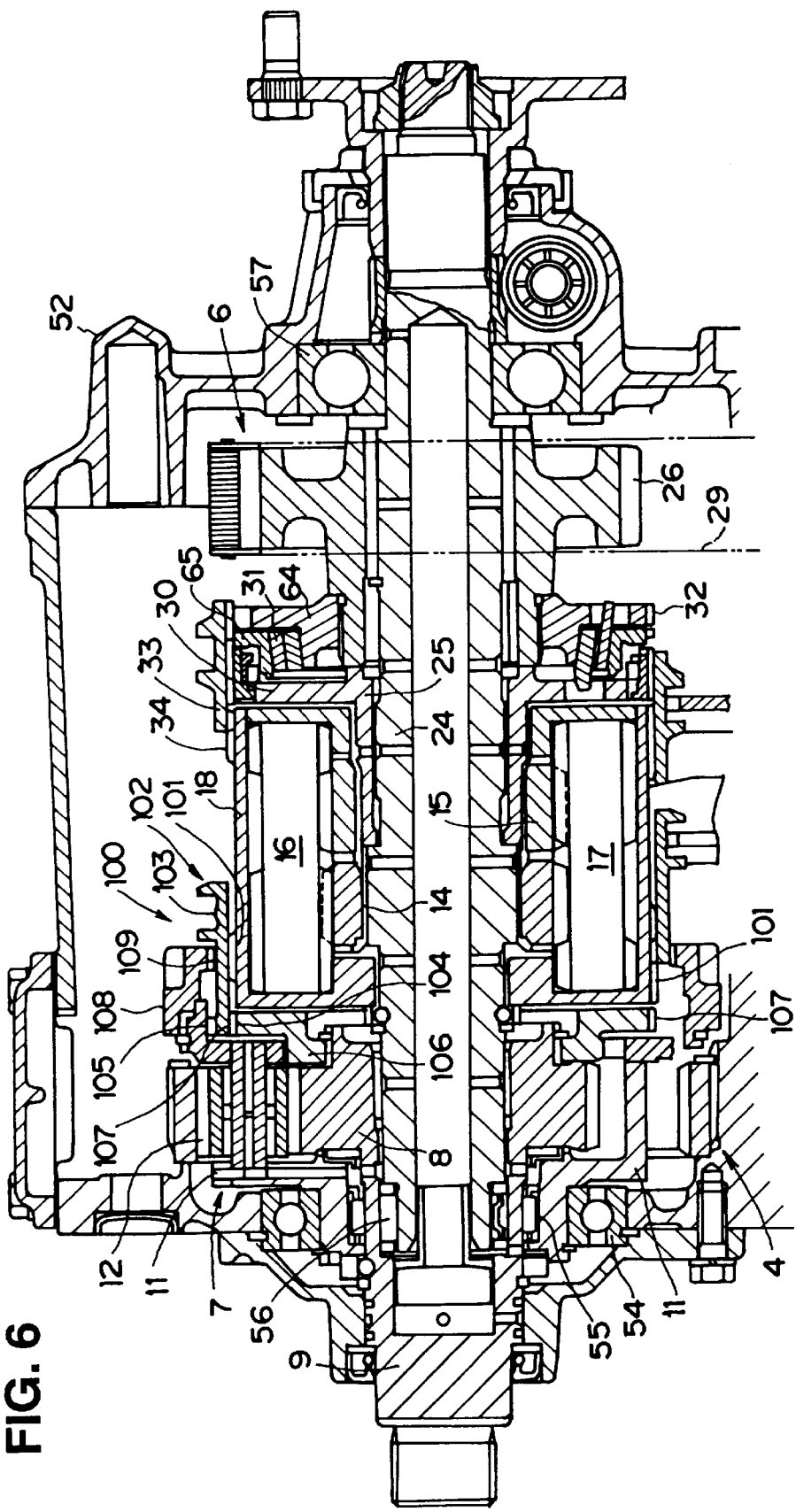
FIG. 6 is a sectional view showing a portion of another embodiment of a power transmission system according to the invention with its upper and lower portions being in different action states.

Here will be described another specific embodiment of the invention. As shown in FIG. 6, the construction of the foregoing specific embodiment is improved such that a speed change mechanism 100 for changing the input to the differential mechanism 5 into inputs having at least two high and low gear ratios and for transmitting the changed inputs is disposed around the differential case 18. This speed change mechanism 100 corresponds to the switching mechanism 19 in the foregoing specific embodiment.

In the outer circumference of the differential case 18 and at the end portion on the side of the aforementioned single-pinion type planetary gear mechanism 7, there is formed a spline 101 which is directed in the axial direction to fit a shift sleeve 102 in engagement with the spline 101 and in a manner to move freely in the axial direction. At the righthand end portion of the shift sleeve 102, as seen from FIG. 6, there is formed an engagement portion 103 for engaging the (not-shown) shift fork therewith, and splines 104 and 105 are formed in the two faces of the inner and outer circumferences of a cylindrical portion protruded leftward of FIG. 6 (toward the single-pinion type planetary gear mechanism 7) from the engagement portion 103.

On the other hand, a disc-shaped spline piece 106 is integrated with the sun gear 8 of the single-pinion type planetary gear mechanism 7. Specifically, the inner circumference of the disc-shaped spline piece 106 is splined to the boss portion of the sun gear 8 so that the two may be coupled to rotate integrally. The outer circumference end of the spline piece 106 is extended to substantially the same radial position as the outer circumference of the differential case 18, and a spline 107 similar to the spline 101 formed in the outer circumference of the differential case 18 is formed in the outer circumference end of the spline piece 106. With the spline 107 of the spline piece 106, more specifically, there is engaged the spline 104 of the leading end inner circumference of the shift sleeve 102 thereby to couple the sun gear 8 and the differential case 18

Moreover, the carrier 10 is integrated with a cylindrical spline piece 108. This spline piece 108 is extended at its one end portion toward the outer circumference of the differential case 18, i.e., toward the outer circumference of the shift sleeve 102, and a spline 109 is formed in the inner circumference of the extended end portion. This spline 109 is positioned axially apart from the spline 107 in the spline piece 106 integrated with the sun gear 8. Therefore, the shift sleeve 102 moves in the axial direction to disengage the spline 104 in the leading end inner circumference from the spline 107 in the spline piece 106 integrated with the sun gear 8. After this, the spline 105 in the leading end outer circumference comes into engagement with the spline 109 in the spline piece 108 integrated with the carrier 10, so that the carrier 10 and the differential case 18 are coupled.

In the planetary gear mechanism 7, as has been described hereinbefore, the sun gear 8 is integrated with the input shaft 9, and the ring gear 12 is fixed. When the carrier 10 is used as the output element, the carrier 10 is rotated at a speed decelerated with respect to the sun gear 8 or the input element. If the shift sleeve 102 is engaged with the spline 109 in the spline piece 108 integrated with the carrier 10 to couple the carrier 10 and the differential case 18, as seen from the lower half of FIG. 6, the input to the differential case 18 is amplified in its torque at a lower gear ratio (or in the so-called "low state"). If the shift sleeve 102 is engaged with the spline 107 in the spline piece 106 integrated with the sun gear 8 to couple the sun gear 8 and the differential case 18, as seen from the upper half of FIG. 6, on the other hand, the input is directly fed to the differential case 18 from the sun gear 8 so that the planetary gear mechanism 7 does not perform the speed changing action. In short, the speed changing state to be set by the speed change mechanism 100 is at a higher gear ratio (or in the so-called "high state").

In the construction shown in FIG. 6, the speed change mechanism 100 for switching the input to the differential mechanism 5 into at least the two high and low gear ratios is not arrayed in the axial direction with respect to the differential mechanism 5 but arranged radially outside of the differential mechanism 5. Therefore, the planetary gear mechanism 7, the differential mechanism 5 and the transfer 6 can be arranged close to one another in the axial direction thereby to shorten the entire length of the power transmission system. On the other hand, the aforementioned torque sensing type differential mechanism 5 meshes the planet pinion gears 16 and 17 housed in the differential case 18, with the paired side gears 14 and 15 which are arrayed close to each other on the common axis, so that it has a relatively small external diameter in its entirety. Therefore, the speed change mechanism 100 is arranged by making use of the surplus space around the differential mechanism 5. As a result, the power transmission system is not increased in its entire external diameter so that it can be made compact as a whole.

Here in the aforementioned high/low switching case, the spline is applied. When the spline rotates at a high speed or when the torque is high, therefore, the spline is hard to engage. In short, the switching may not be smoothed. Therefore, the high/low switching is generally made by stopping the rotation of the spline, e.g., by stopping the vehicle. However, the manual system could be arbitrarily shifted, and the high/low switching might be made while the vehicle is running. In order to smooth the switching from the low to the high gear ratio, it is possible to provide a synchro mechanism 120, as exemplified in FIGS. 7 and 8.

Figure 7:
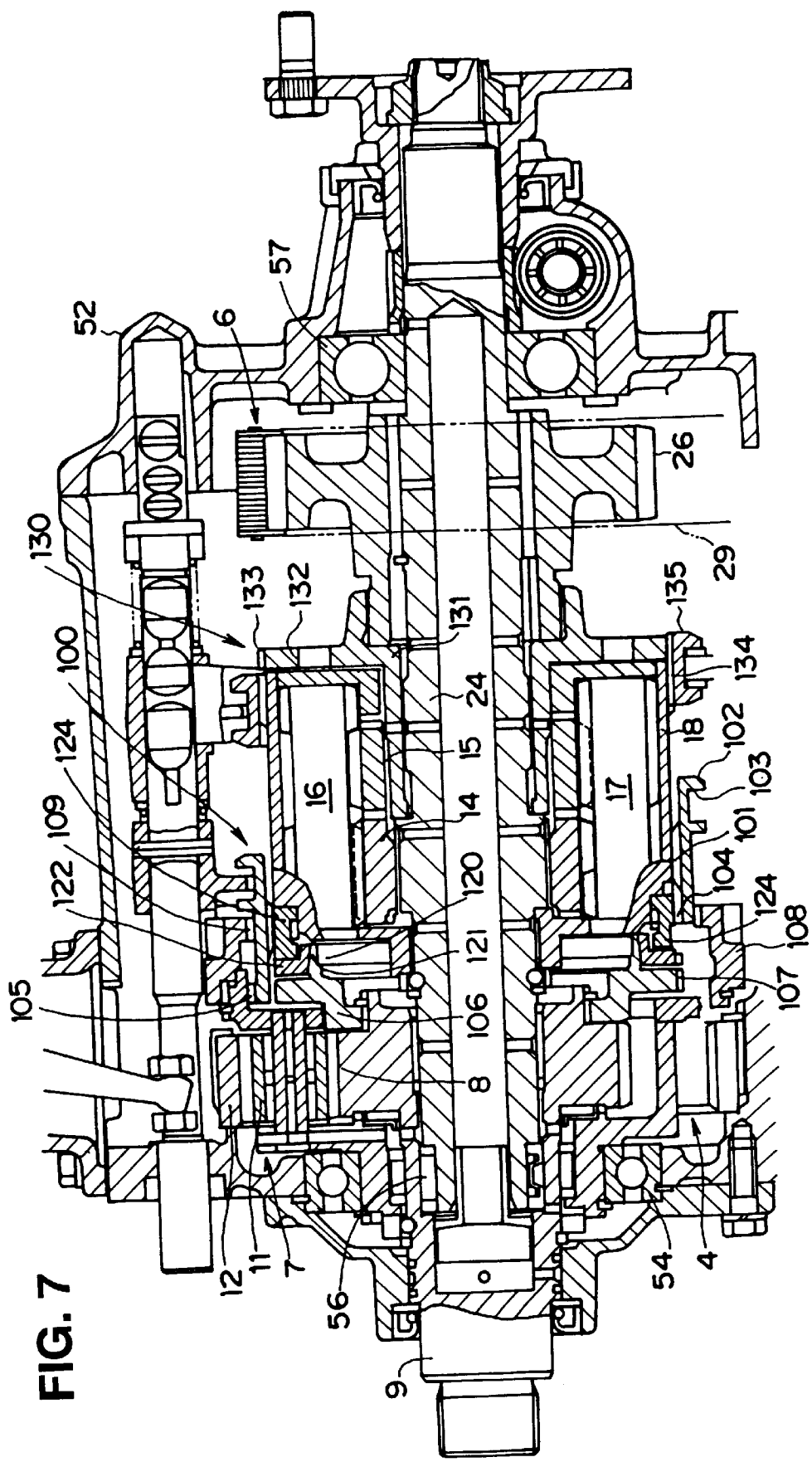
FIG. 7 is a sectional view showing a portion of still another embodiment of the power transmission system according to the invention with its upper and lower portions being in different action states.

At the radially intermediate portion of the spline piece 106 integrated with the sun gear 8, as shown in FIG. 7, there is formed a taper cone portion 121 which is protruded toward the differential case 18 and converged toward its leading end. A synchronizer ring 122 is so fitted around the taper cone portion 121 as to slightly move in the axial direction.

Figure 8:
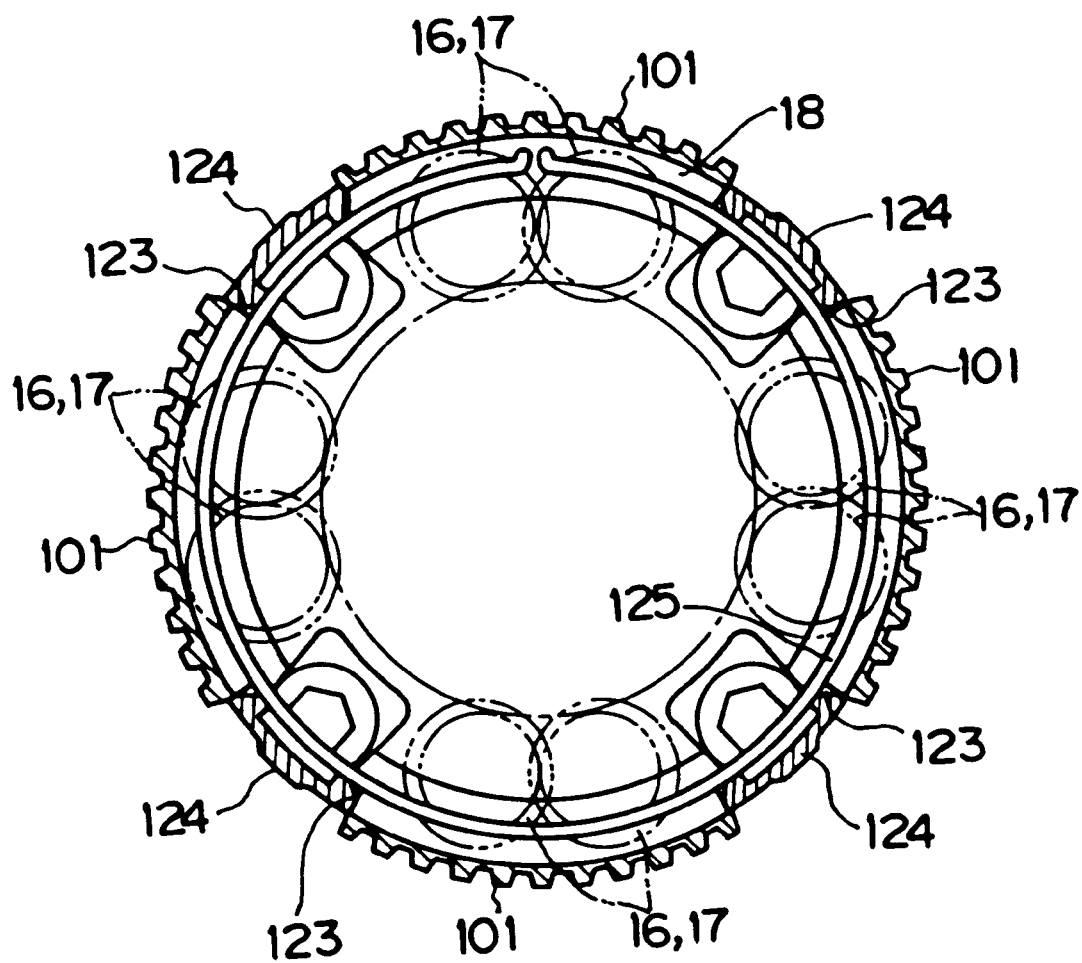
FIG. 8 is a transverse side elevation of a differential case for explaining the arrangement state of a shifting key of the power transmission system.

As shown in FIG. 8, on the other hand, the differential mechanism 5 has a structure in which four pairs of planet pinion gears 16 and 17 are housed in the recesses formed equidistantly in the differential case 18. Therefore, this differential case 18 has surplus spaces between the recesses housing those planet pinion gears 16 and 17. In the construction shown in FIGS. 7 and 8, therefore, there are formed between the recesses for the planet pinion gears in the differential case 18 notches 123 which are extended in the axial direction toward the end portions. Shifting keys 124 are axially movably fitted in those notches 123. Here, reference numeral 125 in FIG. 8 designates shifting key spring.

When the switching is performed from the low to high gear ratio in the construction shown in FIGS. 7 and 8, therefore, the shift sleeve 102 engaging with the spline 109 in the spline piece 108 integrated with the carrier 10 is moved leftward of FIG. 7 to bring the spline 104 formed in its leading end inner circumference into engagement with the spline 107 in the spline piece 106 integrated with the sun gear 8. When the shift sleeve 102 moves toward the planetary gear mechanism 7, the shifting keys 124 arranged in its inner circumference move together with the shift sleeve 102. As a result, the shifting keys 124 push the synchronizer ring 122 into contact with the taper cone portion 121. Thus, the torque transmission takes place between the taper cone portion 121 and the synchronizer ring 122 and further between the sun gear 8 and the differential case 18 so that the sun gear 8 and the differential case 18 are gradually synchronized in their rotations. Even at the switching from the low to high gear ratio with the rotational difference between the sun gear 8 and the differential case 18, therefore, the shift sleeve 102 comes into smooth engagement with the spline 107 in the spline piece 106 integrated with the sun gear 8, so that the switching from the low to high gear ratio can be smoothed.

In the construction shown in FIGS. 7 and 8, moreover, the shifting keys 124 forming part of the synchro mechanism 120 are held by the differential case 18. In other words, the differential case 18 forms part of the synchro mechanism 120. As compared with the structure in which all the constructions of the synchro mechanism 120 are made different from the differential case 18, therefore, the power transmission system can be shortened in its whole length.

Here, FIGS. 7 and 8 show an example of the so-called "full time" four-wheel drive power transmission system which cannot set the two-wheel drive state. Therefore, the power transmission system is provided not with a mechanism corresponding to the first and second selective coupling mechanisms shown in FIGS. 1 and 2 but in place with a lock mechanism 130 for inhibiting the differential action selectively. At the intermediate portion of a cylindrical shaft 131 for coupling the second side gear 15 and the drive sprocket 26, more specifically, there is integrally disposed a flange portion 132 which has an external diameter substantially equal to that of the differential case 18. A spline 133 is formed in the outer circumference end of the flange portion 132.

In the outer circumference of the end portion of the differential case 18 on the side of the flange portion 132, on the other hand, there is formed a spline 134 which is similar to the spline 133 in the flange portion 132. Moreover, a locking sleeve 135 so engages with the spline 134 in the differential case 18 as to move back and forth in the axial direction. If the locking sleeve 135 is disengaged from the spline 133 of the flange portion 132, as seen from the upper half of FIG. 7, the torque inputted to the differential case 18 is outputted from the individual side gears 14 and 15, thereby to establish the differential action for the differential mechanism 5 to absorb the differential rotations between the front and rear wheels. If the locking sleeve 135 is moved rightward of FIG. 7 into engagement with the spline 133 of the flange portion 132, on the other hand, the differential case 18 and the second side gear 15 are coupled so that the differential mechanism 5 is rotated integrally as a whole. As a result, the differential mechanism 5 does not perform the differential action to establish the so-called "directly coupled" four-wheel drive state.

Here, the lock mechanism 130 shown in FIG. 7 can be adopted in place of the first and second selective coupling mechanisms of the power transmission system having the construction shown in FIG. 1 or the power transmission system having the construction shown in FIG. 6.

Here will be enumerated the constructions characterizing the power transmission system thus far disclosed as the specific embodiments. Herein disclosed is a power transmission system characterized: in that at least one pair of planetary gears meshing with each other are held rotatably and revolvably in a cylindrical case member and in sliding contact with the inner face of the case member; in that a first output gear meshing with one planetary gear and a second output gear meshing with the other planetary gear are arranged along the center axis of the case member; and in that a coupling mechanism for integrating one of the two output gears and the case member selectively in the rotating direction is disposed around the case member.

On the other hand, there is disclosed a power transmission system characterized in that the coupling mechanism includes: a spline formed in the outer circumference of the case member; a hub member having an external diameter substantially equal to that of the spline and a spline formed in its outer circumference and integrated with one of the output gears in the rotating direction; and a mechanism for moving the hub member and the outer circumference of the case member back and force in the axial direction to spline the hub member and the case member selectively thereby to integrate the hub member and the case member in the rotating direction.

The power transmission systems of these constructions aim at shortening the axial length and making a compact structure by arranging a mechanism for setting a differential mechanism, which includes at least one pair of planetary gears, a case member for retaining the planetary gears, and two output gears in a locked state and a free state, not in an axial juxtaposition to but with a radial displacement from the differential mechanism.

On the other hand, a switching mechanism for moving and positioning a predetermined operation member sequentially to and at first to third positions arrayed on a straight line can be made to have the following construction. Specifically, there is disclosed a power transmission system comprising a switching mechanism including: a stationary shaft; a moving shaft arranged in parallel with the stationary shaft and made movable back and forth in the axial direction; an operation member fitted relatively movably on those individual shafts; first and second fixing members arranged on the two sides across the operation member and fitted relatively movably on the individual shafts; a mechanism for coupling the operation member to the moving shaft, when the moving shaft moves in a first direction on the side of the first fixing member, and for integrating the operation member, the first fixing member and the stationary shaft with respect to the first direction thereby to fix the operation member at the first position; a mechanism for bringing the operation member into abutment against a second fixing member, when the moving shaft is moved by a predetermined distance in a second direction opposed to the first direction to the second position, and for coupling the operation member and the second fixing member to the stationary shaft; a mechanism for decoupling the moving shaft and the operation member at the second position to enable the moving shaft to move in the second direction; a mechanism for coupling the operation member and the second fixing member to the moving shaft to enable them to move in the second direction after the moving shaft moved from the second position in the second direction relative to the operation member; and a mechanism for coupling the operation member and a second high-low member to the stationary shaft to fix them with respect to the second direction when the operation member and the second fixing member moved to the third position together with the moving shaft in the second direction.

This system is intended to make its construction simple and compact by constructing a switching mechanism for switching drive states into the two-wheel drive state, the four-wheel drive state inhibiting the differential rotations between the front and rear wheels, and the four-wheel drive state allowing the differential rotations between the front and rear wheels, into such a linear moving type mechanism as can be positioned at three positions by a single actuator.

Here will be synthetically described the advantages which are obtained by the invention. According to the invention, the two-wheel drive state is set with the differential mechanism having the torque sensing type differential limiting function being integrated as a whole. As a result, the power can be outputted through the differential mechanism to the front wheels or the rear wheels so that no differential mechanism other than the mechanism for setting the two-wheel drive state need be especially provided to make the system compact. Thus, it is possible to provide a high versatile power transmission system for a four-wheel drive vehicle, which can set the two-wheel drive state, the four-wheel drive state allowing the differential rotations, and the four-wheel drive state inhibiting the differential rotations.

According to the invention, on the other hand, the differential mechanism is constructed to integrate the entirety by coupling the case member and one output member, so that a load to act on the tooth surface of the gear constructing the differential mechanism can be lowered in the two-wheel drive state. As a result, the restricting conditions on the strength of the differential mechanism can be loosened to reduce the size of the differential mechanism or to improve the flexibility for the design.

According to the invention, moreover, it is possible to set the four-wheel drive state, in which the differential mechanism is locked to inhibit the differential rotations between the front and rear wheels, and the four-wheel drive state in which the differential mechanism is freed to allow the differential rotations between the front and rear wheels.

According to the invention, moreover, the switching mechanism for switching the two-wheel drive state, the four-wheel drive state inhibiting the differential rotations between the front and rear wheels, and the four-wheel drive state allowing the differential rotations between the front and rear wheels is provided with a mechanism which can be positioned at positions corresponding to those drive states by a linear movement. As a result, the switching mechanism and a device for driving the former can be simplified to make the entire construction of the power transmission system simple and compact.

According to the invention, still moreover, the differential mechanism and the speed change mechanism are juxtaposed not in the axial direction but in the radial direction. With the differential mechanism being constructed so that the pinion gears meshing with the paired side gears are held in the case member, therefore, it is possible to effectively utilize the surplus space which is formed around the outer circumference in the radial direction. As a result, the power transmission system can be shortened in its entire axial length and accordingly made compact.

According to the invention, furthermore, the speed change mechanism for switching and transmitting the input to the differential mechanism to at least two high and low gear ratios is arranged around the member acting as an input element of the differential mechanism or the case member. As a result, the number of members to be arrayed in the axial direction with respect to the differential mechanism can be reduced to utilize the space around the differential mechanism effectively so that the entire construction of the power transmission system can be made compact.

What is claimed is:

1. A power transmission system for a four-wheel drive vehicle, which has a differential mechanism having a torque sensing type differential limiting function and including an input element and two output elements made rotatable differentially of each other by receiving a power from said input element for establishing a torque limiting a differential rotation in response to an input torque, one of said two output elements being integrated with a front wheel side drive member, and the other output element being coupled to a rear wheel side drive member, comprising:

a torque distribution mechanism for transmitting a torque to a front-wheel drive shaft connected to front wheels or a rear-wheel drive shaft connected to rear wheels;

a first selective coupling mechanism for coupling said torque distribution mechanism selectively to said front-wheel side drive member or said rear-wheel side drive member; and a second selective coupling mechanism for coupling said input element and one of said output elements, when said first selective coupling mechanism releases the coupling between said torque distributing mechanism and the front-wheel or rear-wheel side drive member, to integrate said differential mechanism as a whole thereby to establish a two-wheel drive state;

wherein said differential mechanism includes: two side gears arranged as said output elements on a common axis; and a case member acting as said input element and holding a first pinion gear meshing with one of said side gears and a second pinion gear meshing with said first pinion gear and the other side gear so that they can rotate and revolve in sliding contact, and wherein said second selective coupling mechanism includes coupling means for coupling said case member and one of said side gears selectively to rotate integrally.

2. A power transmission system for a four-wheel drive vehicle according to claim 1, wherein said first selective coupling mechanism includes: a mechanism for coupling said one side gear and said torque distributing mechanism when said case member and said one side gear are coupled by said second selective coupling mechanism; and a mechanism for coupling said one side gear and said torque distributing mechanism when said case member and said one side gear are decoupled by said second selective coupling mechanism.

3. A power transmission system for a four-wheel drive vehicle according to claim 1, wherein said first selective coupling mechanism includes: a sleeve member fitted unrotatively and axially movably on an outer circumference of said case member; and a coupling member integrated with one of said two side gears and engaging with said sleeve member when said sleeve member moves in the axial direction, and wherein said second selective coupling mechanism includes a hub member made rotatable integrally with an input member of said torque distributing mechanism and engaging with said sleeve member relatively unrotatively, when said sleeve member moves in the axial direction, so that it is integrated in the rotating direction with said coupling member.

4. A power transmission system for a four-wheel drive vehicle according to claim 1, further comprising:

a speed change mechanism disposed around said case member for switching at least two high and low gear ratios.

5. A power transmission system for a four-wheel drive vehicle according to claim 2, wherein there are arrayed on a straight line: a first position at which said first selective coupling mechanism is set to decouple said one side gear and said torque distributing mechanism and at which said second selective coupling mechanism is set to couple said one side gear and said case member; a second position at which said first selective coupling mechanism is set to couple said one side gear and said torque distributing mechanism and at which said second selective coupling mechanism is set to couple said one side gear and said case member; and a third position at which said first selective coupling mechanism is set to couple said one side gear and said torque distributing mechanism and at which said second selective coupling mechanism is set to decouple said one side gear and said case member, further comprising: a switching mechanism adapted to be linearly moved to and positioned at any of said first position to said third position for switching said individual selective coupling mechanisms.

6. A power transmission system for a four-wheel drive vehicle according to claim 5, wherein said switching mechanism includes:
    a stationary rod;
    a moving rod arranged in parallel with said stationary rod and adapted to be moved back and forth in the axial direction;
    a moving block fitted relatively movably on those rods and adapted to be moved to a position corresponding to any of said first position to said third position;
    a first stop mechanism for fixing said moving block at a position corresponding to said first position by coupling said moving block in one axial direction with respect to said stationary rod;

a first coupling mechanism for coupling said moving block to said moving rod and setting the same free from said stationary rod between a position corresponding to said first position and a position corresponding to said second position, and for coupling said moving block to said stationary rod and setting the same free from said moving rod at a position corresponding to said second position and at a predetermined stroke of said moving rod;

a second coupling mechanism for coupling said moving block to said moving rod and setting the same free from said stationary rod between a position corresponding to said second position and a position corresponding to said third position; and a second stop mechanism for fixing said moving block at a position corresponding to said third position by coupling said moving block in the other axial direction with respect to said stationary rod.

7. A power transmission system for a four-wheel drive vehicle according to claim 6, wherein said first stop mechanism includes: a first sleeve fitted on said stationary rod and said moving rod; and a first stationary member mounted on said stationary rod for bringing said moving block into abutment in said one axial direction through said first sleeve when said moving block is at the position corresponding to said first position, wherein said first coupling mechanism includes: a first lock pin retained by said first sleeve and protruded selectively to said stationary rod and said moving rod; and a plurality of recesses formed in outer faces of the individual rods for fitting said first lock pin selectively therein, wherein said second coupling mechanism includes: a second lock pin retained by said moving block and protruded selectively to said stationary rod and said moving rod; and a plurality of other recesses formed in the outer faces of the individual rods for fitting said second lock pin selectively therein, and wherein said second stop mechanism includes: a second sleeve fitted on said stationary rod and said moving rod; and a second stationary member mounted on said stationary rod for bringing said moving block into abutment in said other axial direction through said second sleeve when said moving block is at the position corresponding to said third position.

8. A power transmission system for a four-wheel drive vehicle according to claim 6, wherein said first stop mechanism includes: a first sleeve fitted on said stationary rod and said moving rod; a first pinion held by said first sleeve and meshing with racks formed on the individual rods; and a first abutment member for bringing said moving block into abutment against said first sleeve in said one axial direction through said first sleeve when said moving block is at a position corresponding to said first position, wherein said first coupling mechanism includes: a first lock pin retained by said first sleeve and protruded selectively to said stationary rod and said moving rod; and a plurality of recesses formed in the outer faces of the individual rods for fitting said first lock pin selectively therein, wherein said second coupling mechanism includes: a second lock pin retained by said moving block and protruded selectively to said stationary rod and said moving rod; and a plurality of other recesses formed in the outer faces of the individual rods for fitting said second lock pin selectively therein, and wherein said second stop mechanism includes: a second sleeve fitted on said stationary rod and said moving rod; a second pinion held by said second sleeve and meshing with other racks formed on the individual rods; and a second abutment member for bringing said moving block into abutment against said second sleeve in said other axial direction when said moving block is at the position corresponding to said third position.

9. A power transmission system for a four-wheel drive vehicle according to claim 3, further comprising:

a synchro mechanism for rotating said coupling member and said hub member when said sleeve member moves from the side of said coupling member to the side of said hub member to transmit the torque gradually between said coupling member and said hub member.

10. A power transmission system for a four-wheel drive vehicle according to claim 3, wherein the outer circumference of said case member, an outer circumference end of said coupling member and an outer circumference end of said hub member are arrayed at substantially identical radial positions in the axial direction, further comprising: a switching mechanism for moving said sleeve member to a first position to couple said case member and said coupling member, to a second position to couple said case member, said coupling member and said hub member, and to a third position to couple said coupling member and said hub member.

11. A power transmission system for a four-wheel drive vehicle according to claim 4, further comprising:

a gear mechanism for setting the gear ratio at a high value and at a low value, wherein said speed change mechanism includes a coupling member for coupling said case member to said gear mechanism.

12. A power transmission system for a four-wheel drive vehicle according to claim 4, further comprising:

a planetary gear mechanism including a sun gear acting as the input element, a ring gear acting as a stationary element, and a carrier acting as the output element and holding a pinion meshing with said sun gear and said ring gear, wherein said speed change mechanism includes a shift sleeve fitted unrotatively but axially movably on the outer circumference of said case member for coupling said case member selectively to said sun gear and said carrier.

13. A power transmission system for a four-wheel drive vehicle, which has a differential mechanism having a torque sensing type differential limiting function and including an input element and two output elements made rotatable differentially of each other by receiving a power from said input element for establishing a torque limiting a differential rotation in response to an input torque, one of said two output elements being integrated with a front wheel side drive member, and the other output element being coupled to a rear wheel side drive member, comprising:

a torque distribution mechanism for transmitting a torque to a front-wheel drive shaft connected to front wheels or a rear-wheel drive shaft connected to rear wheels;

a first selective coupling mechanism for coupling said torque distribution mechanism selectively to said front-wheel side drive member or said rear-wheel side drive member;

a second selective coupling mechanism for coupling said input element and one of said output elements, when said first selective coupling mechanism releases the coupling between said torque distributing mechanism and the front-wheel or rear-wheel side drive member, to integrate said differential mechanism as a whole thereby to establish a two-wheel drive state; and wherein said differential mechanism includes: a pair of side gears arrayed as said output element on a common axis; a planet pinion gear made rotatable and revolvable for transmitting the torque between said paired side gears; and a case member holding said planet pinion gear in frictional contact with its inner face and rotating on said axis, and wherein said second selective coupling mechanism includes coupling means for coupling said case member and said one side gear selectively to rotate integrally.

14. A power transmission system for a four-wheel drive vehicle according to claim 13, further comprising:

a speed change mechanism disposed around said case member for switching at least two high and low gear ratios.

15. A power transmission system for a four-wheel drive vehicle according to claim 14, further comprising:

a gear mechanism for setting the gear ratio at a high value and at a low value, wherein said speed change mechanism includes a coupling member for coupling said case member to said gear mechanism.

16. A power transmission system for a four-wheel drive vehicle according to claim 14, further comprising:

a planetary gear mechanism including a sun gear acting as an input element, a ring gear acting as a stationary element, and a carrier acting as an output element and holding a pinion meshing with said sun gear and said ring gear, wherein said speed change mechanism includes a shift sleeve fitted unrotatively but axially movably on the outer circumference of said case member for coupling said case member selectively to said sun gear and said carrier.

17. A power transmission system for a four-wheel drive vehicle, which has a differential mechanism coupling a pair of side gears arrayed on a common axis in a torque transmitting manner through a rotatable and revolvable planet pinion gear and holding said planet pinion gear in frictional contact with the inner face of a case member rotating on said axis, wherein any two of said paired side gears and said case member act as output elements for outputting the torque to front wheels and rear wheels whereas the other acts as an input element, comprising: a speed change mechanism disposed on the outer circumference of said other acting as the input element, for switching at least two high and low gear ratios.

18. A power transmission system for a four-wheel drive vehicle according to claim 17, wherein said two members acting as the output elements are said paired side gears whereas said other acting as the output element is said case member.

19. A power transmission system for a four-wheel drive vehicle according to claim 18, further comprising:

a gear mechanism for setting the ratio of the rotating speeds between an input member and an output member to a high value and a low value, wherein said speed change mechanism includes a coupling member for coupling said case member to said gear mechanism.

20. A power transmission system for a four-wheel drive vehicle according to claim 18, further comprising:

a sun gear acting as an input element, a ring gear acting as a stationary element, and a carrier acting as an output element and holding a pinion meshing with said sun gear and said ring gear, wherein said speed change mechanism includes a shift sleeve fitted unrotatively but axially movably on the outer circumference of said case member for coupling said case member selectively to said sun gear and said carrier.

* * * * *